(12) United States Patent
Reimer

(10) Patent No.: US 6,691,025 B2
(45) Date of Patent: Feb. 10, 2004

(54) FUEL OPTIMIZATION SYSTEM WITH IMPROVED FUEL LEVEL SENSOR

(75) Inventor: Lawrence B. Reimer, Janesville, WI (US)

(73) Assignee: SSI Technologies, Inc., Janesville, WI (US)

( * ) Notice: Subject to any disclaimer, the term of this patent is extended or adjusted under 35 U.S.C. 154(b) by 0 days.

(21) Appl. No.: 10/163,486

(22) Filed: May 24, 2002

(65) Prior Publication Data

US 2003/0069684 A1 Apr. 10, 2003

Related U.S. Application Data

(62) Division of application No. 09/562,225, filed on Apr. 28, 2000.
(60) Provisional application No. 60/132,497, filed on May 4, 1999.

(51) Int. Cl.[7] .......................... G01F 9/00; G01S 15/00; G06F 17/00
(52) U.S. Cl. .......................... 701/123; 340/450; 73/114
(58) Field of Search ...................... 701/123; 73/290 R, 73/1.73, 113, 114, 1.83; 340/450.2, 450, 612, 616, 618, 439; 137/386, 558; 200/190; 700/280, 282

(56) References Cited

U.S. PATENT DOCUMENTS

| | | | |
|---|---|---|---|
| 3,800,242 A | 3/1974 | Zimmerman et al. | 331/66 |
| 4,135,397 A | 1/1979 | Krake | 73/290 R |
| 4,212,195 A * | 7/1980 | Young | 73/114 |
| 4,217,644 A | 8/1980 | Kato et al. | 364/442 |
| 4,218,744 A * | 8/1980 | Pratt et al. | 364/442 |
| 4,296,472 A | 10/1981 | Sarkis | 364/509 |
| 4,400,779 A * | 8/1983 | Kosuge et al. | 364/442 |
| 4,523,460 A | 6/1985 | Strickler et al. | 73/200 |
| 4,531,406 A | 7/1985 | Fritz | 73/290 V |
| 4,700,569 A | 10/1987 | Michalski et al. | 73/290 V |
| 4,843,575 A | 6/1989 | Crane | 364/550 |
| 4,845,630 A * | 7/1989 | Stephens | 364/442 |
| 4,853,694 A | 8/1989 | Tomecek | 340/621 |
| 4,868,797 A | 9/1989 | Soltz | 367/98 |
| 4,964,065 A | 10/1990 | Hicks et al. | 709/226 |
| 5,089,989 A | 2/1992 | Schmidt et al. | 367/35 |
| 5,131,271 A | 7/1992 | Haynes et al. | 73/290 V |
| 5,157,700 A | 10/1992 | Kurosawa et al. | |

(List continued on next page.)

FOREIGN PATENT DOCUMENTS

| | | |
|---|---|---|
| DE | 295 08 577 | 9/1995 |
| EP | 0 644 404 | 3/1995 |
| FR | 2 710 743 | 4/1995 |
| WO | 88/04031 | 6/1998 |

*Primary Examiner*—Tan Q. Nguyen
*Assistant Examiner*—Dalena Tran
(74) *Attorney, Agent, or Firm*—Michael Best & Friedrich LLP

(57) ABSTRACT

A system for monitoring fuel consumption and optimizing refueling of a vehicle. The system includes a fuel level sensor designed to be mounted on a fuel tank. The fuel sensor has a transducer, such as an ultrasonic transducer, for generating a distance signal that represents the distance between the sensor and the surface of the fuel in the fuel tank. A processor coupled to the transducer is programmed to convert the distance signal to a percentage of capacity signal, calculate the volume of fuel within the fuel tank, and create a message that includes information regarding the volume of fuel in the fuel tank.

The processor of the fuel level sensor is coupled to a network that may include a dispatch terminal, a fuel optimization server, and a fuel-price-by-location service. The network calculates an optimal location for refilling the fuel tank and a route to travel to the location. It broadcasts a message containing the refueling and route information to the vehicle information system, and devices coupled to the vehicle information system then display the message to inform the driver of the vehicle when and where to refuel.

21 Claims, 22 Drawing Sheets

U.S. PATENT DOCUMENTS

| | | | |
|---|---|---|---|
| 5,301,113 A | * 4/1994 | To et al. | 364/442 |
| 5,408,418 A | 4/1995 | Lippmann et al. | 364/509 |
| 5,506,564 A | * 4/1996 | Hargest | 340/450.2 |
| 5,530,680 A | 6/1996 | Whitehurst | 367/99 |
| 5,668,310 A | 9/1997 | Parkman et al. | 73/113 |
| 5,670,886 A | 9/1997 | Wolff et al. | 324/644 |
| 5,693,154 A | 12/1997 | Clark et al. | 148/301 |
| 5,751,611 A | 5/1998 | Jamieson | 364/573 |
| 5,768,939 A | 6/1998 | Quayle et al. | 73/290 V |
| 5,790,973 A | 8/1998 | Blaker et al. | 701/123 |
| 5,793,705 A | * 8/1998 | Gazis et al. | 367/98 |
| 5,814,830 A | 9/1998 | Crowne | 250/577 |
| 5,826,459 A | * 10/1998 | Kataoka et al. | 73/290 R |
| 6,006,604 A | 12/1999 | Rabelo et al. | 73/290 R |
| 6,018,247 A | 1/2000 | Kelly | 324/644 |
| 6,052,629 A | 4/2000 | Leatherman et al. | 700/241 |
| 6,078,850 A | 6/2000 | Kane et al. | 701/29 |
| 6,122,975 A | 9/2000 | Sridhar et al. | 73/754 |
| 6,252,446 B1 | 6/2001 | Zielinski et al. | 327/172 |
| 6,279,379 B1 | 8/2001 | Logue et al. | 73/24.01 |
| 6,373,261 B1 | 4/2002 | Kielb et al. | 324/644 |

* cited by examiner

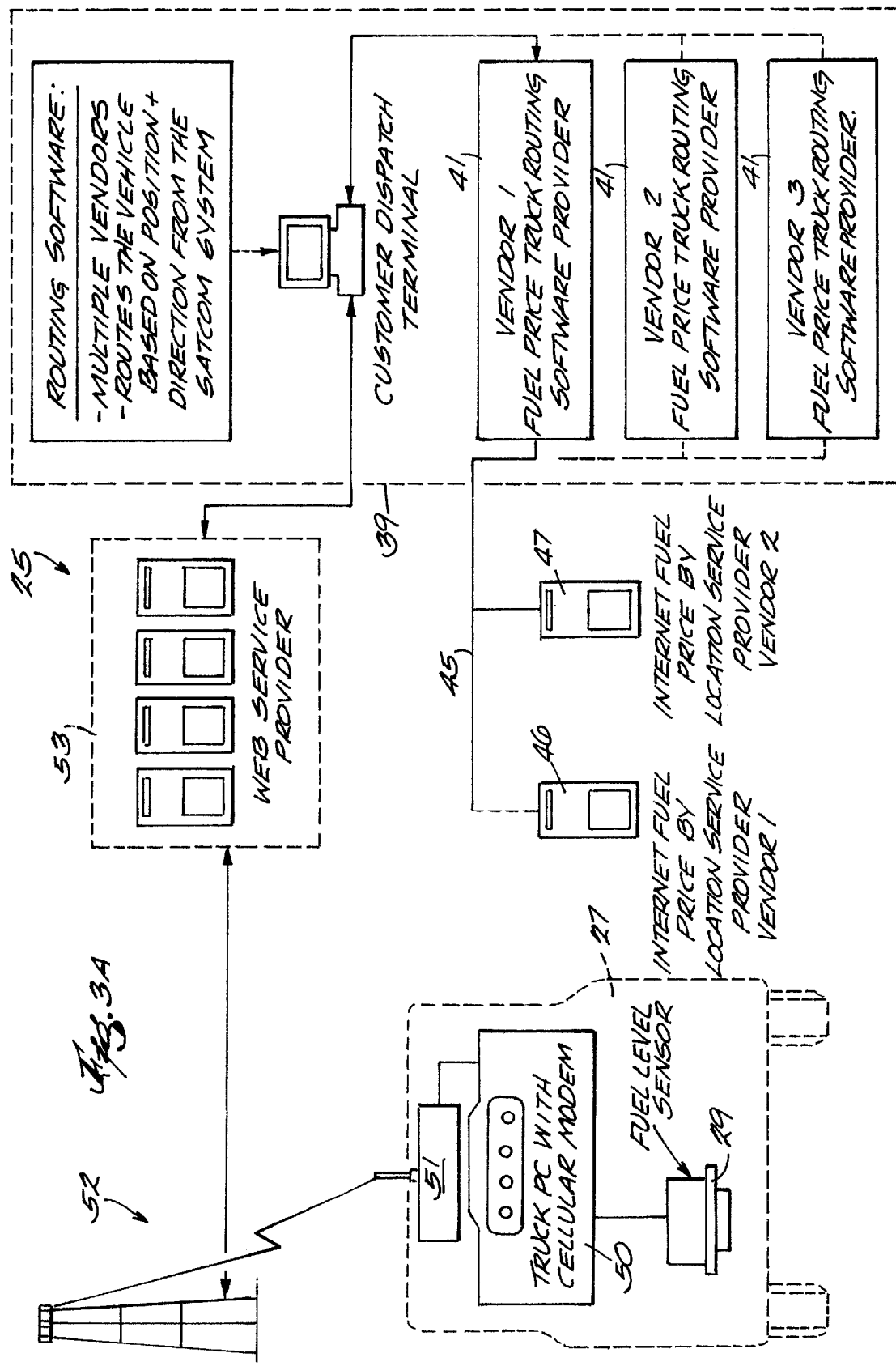

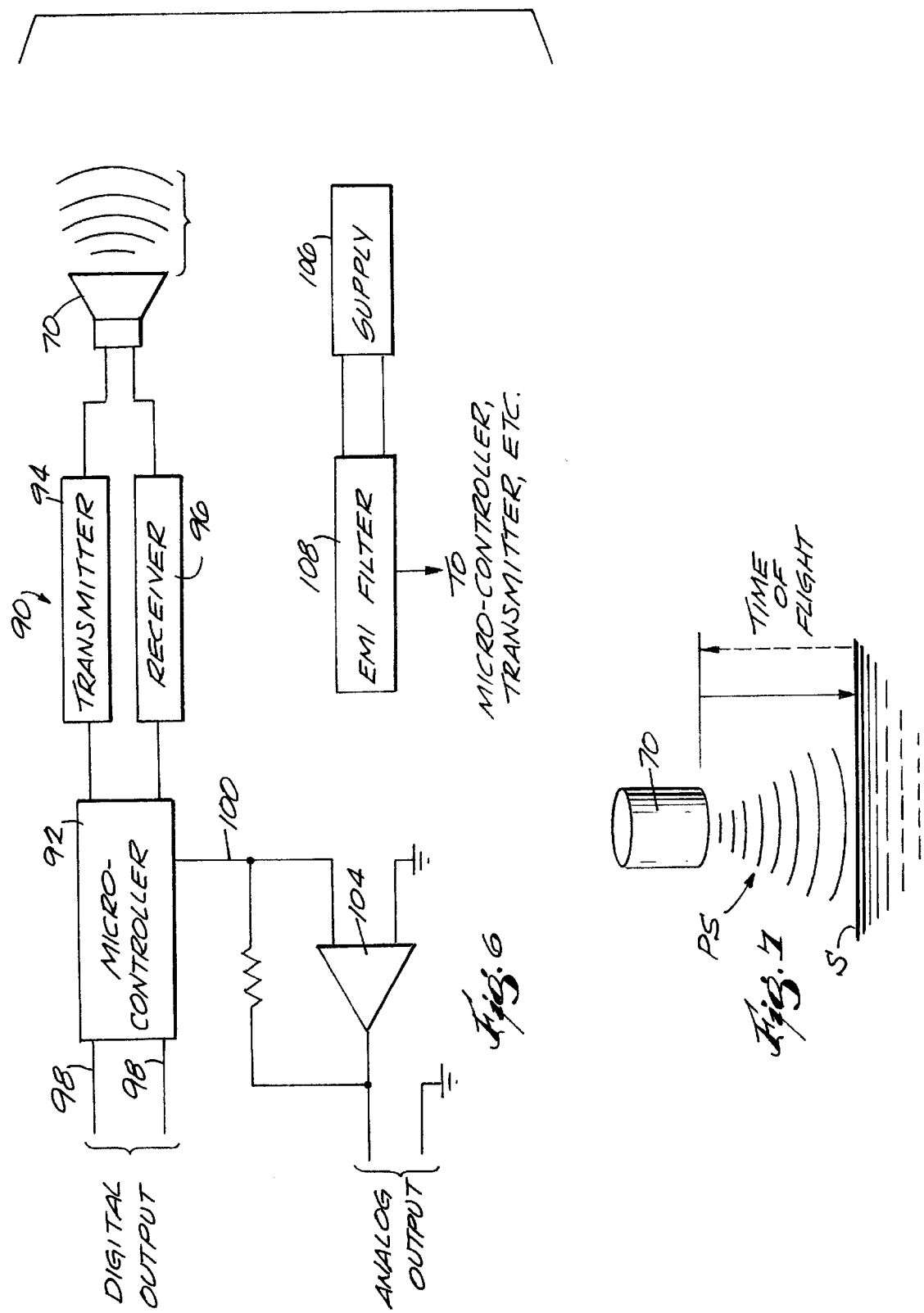

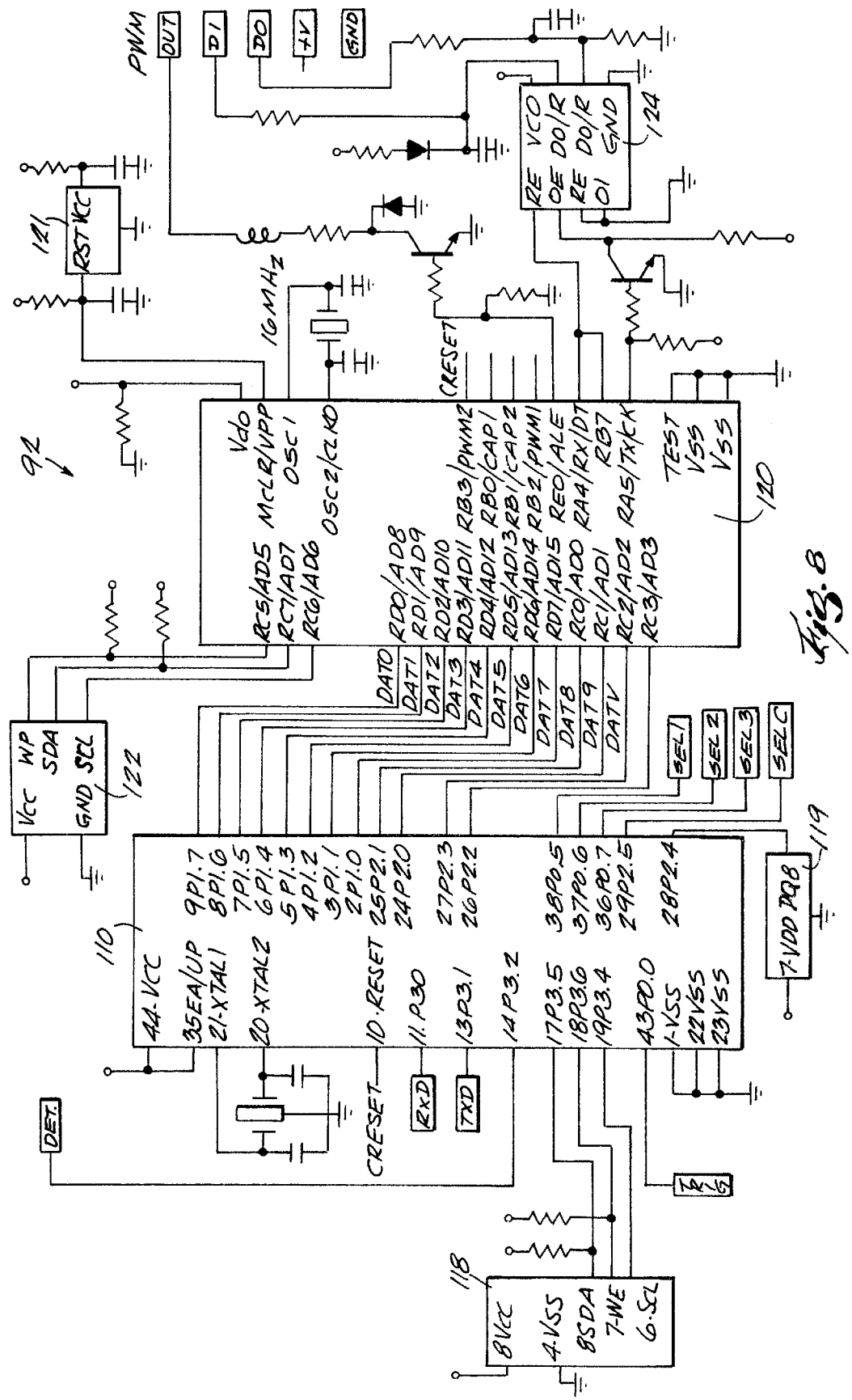

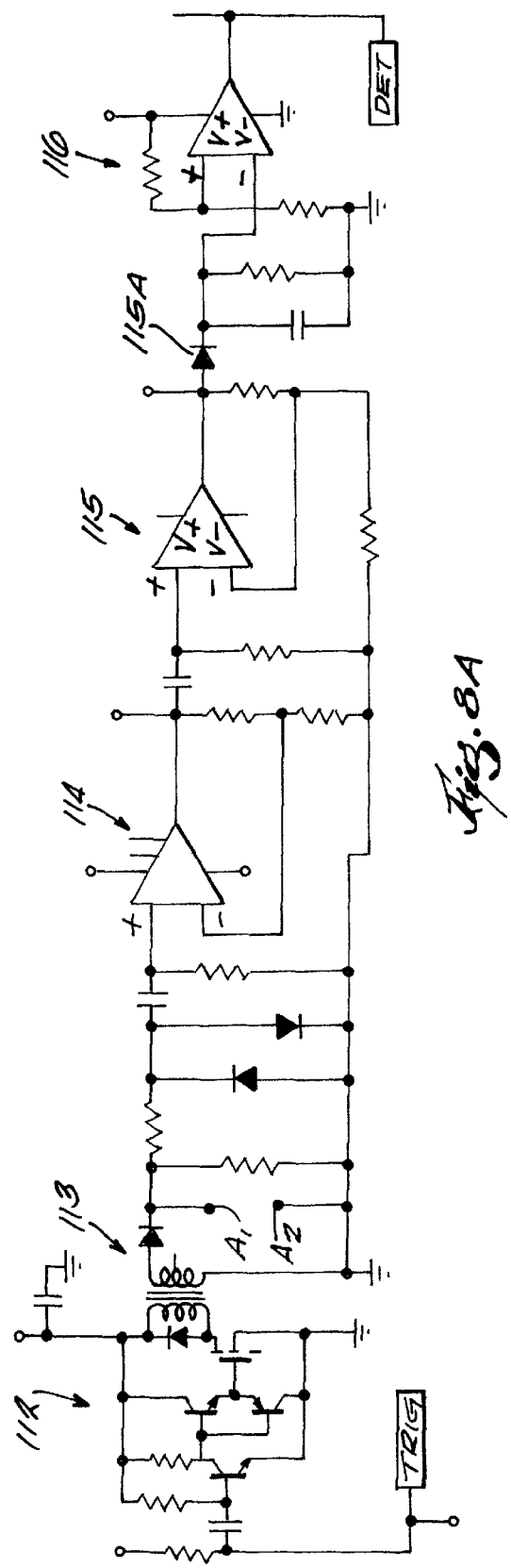

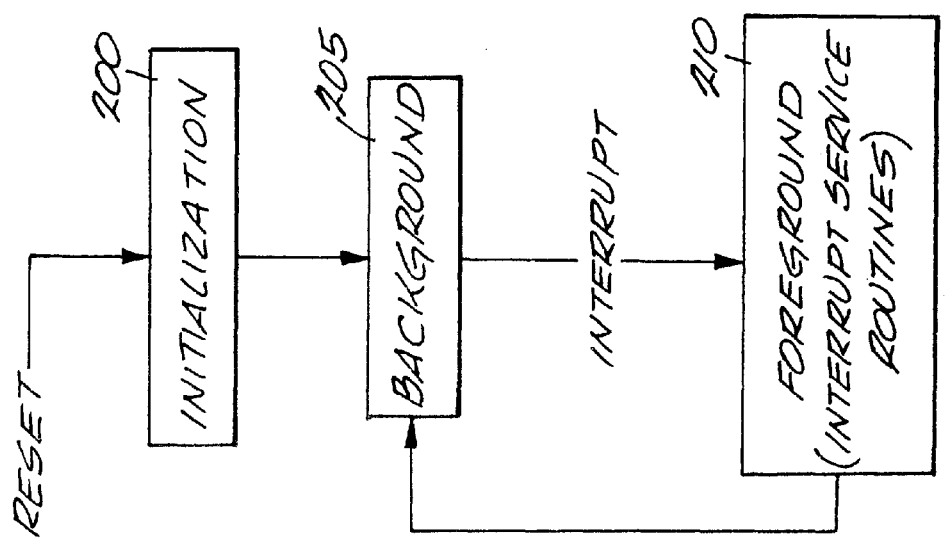

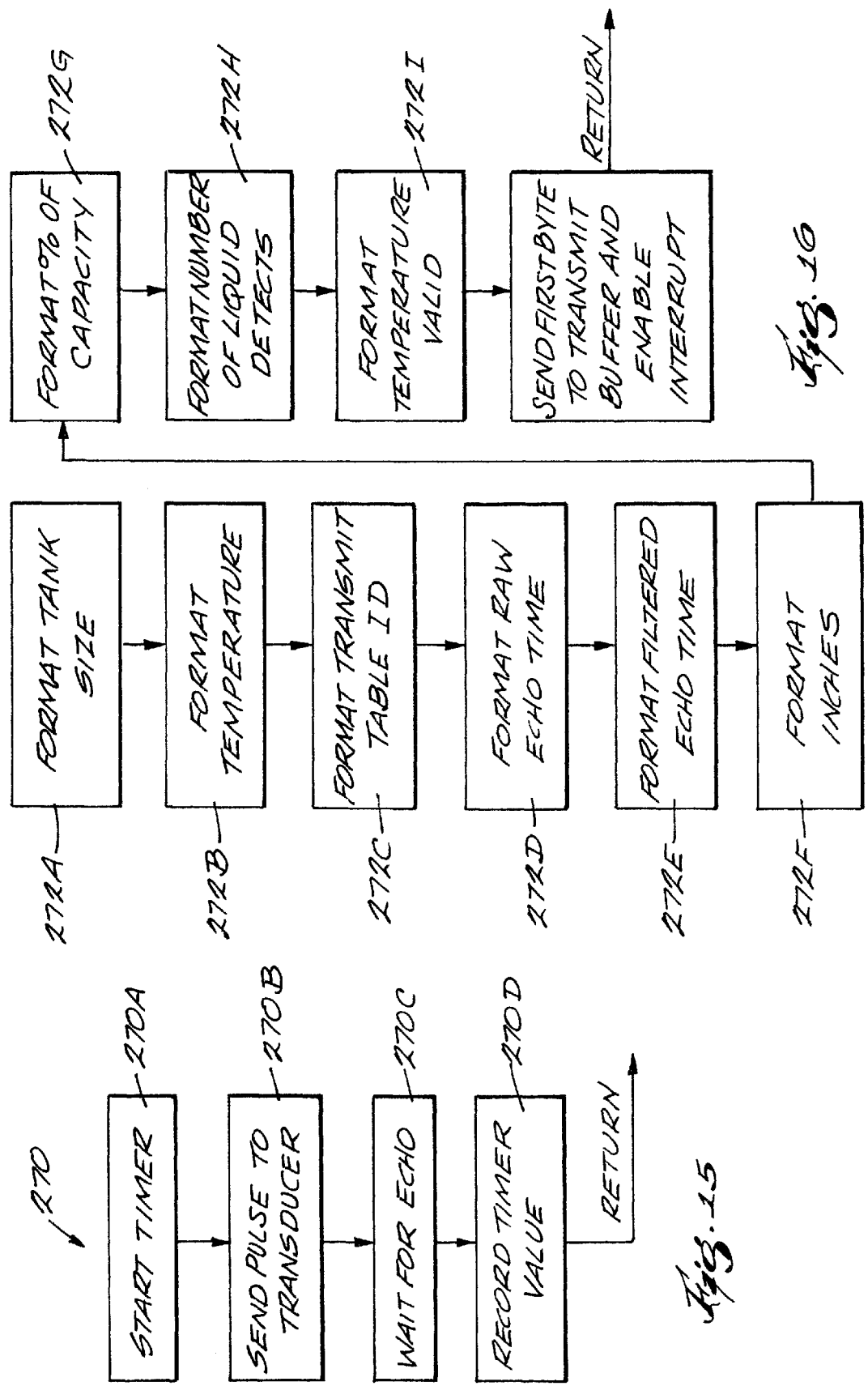

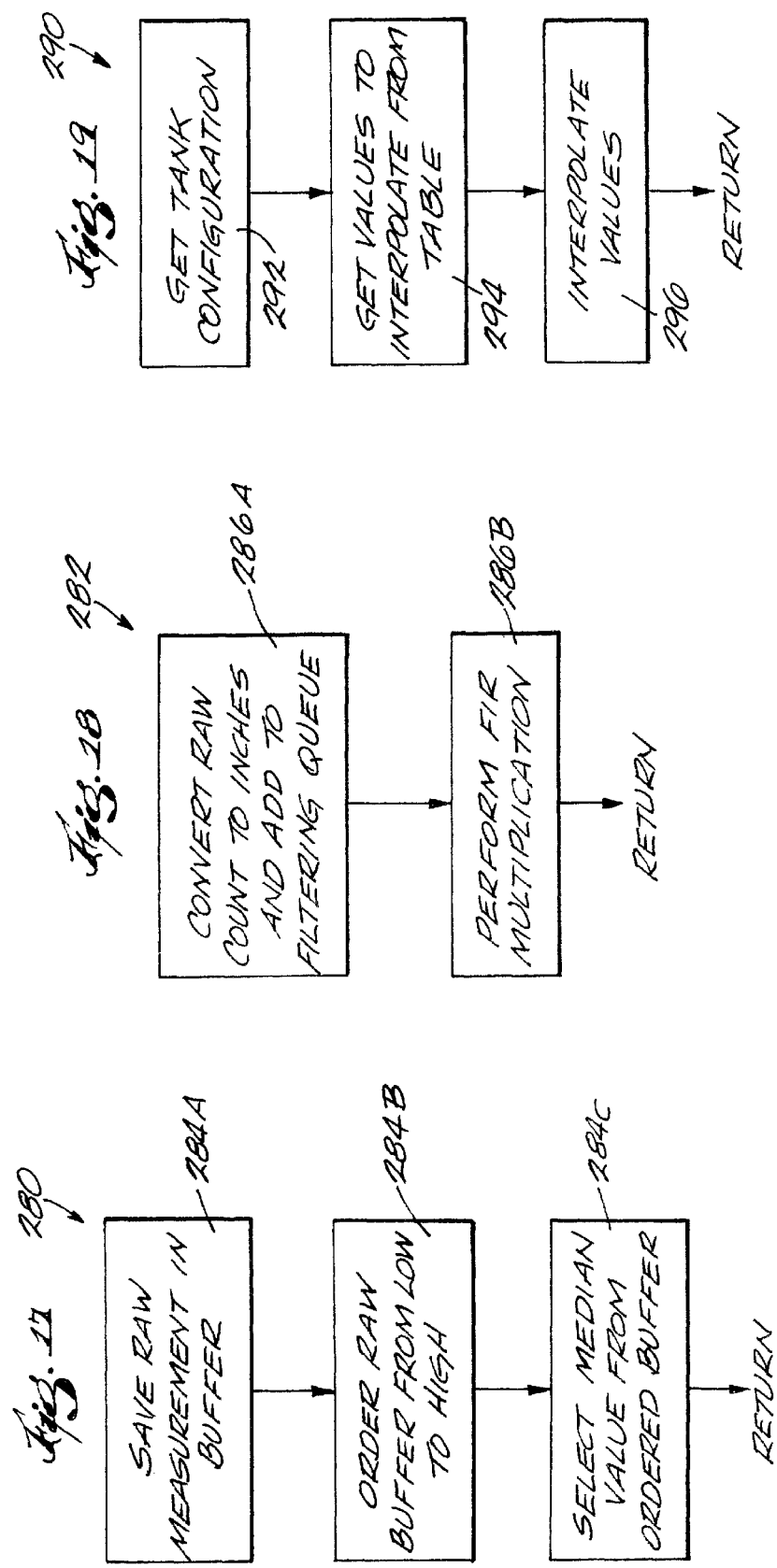

FUEL OPTIMIZATION SYSTEM WITH IMPROVED FUEL LEVEL SENSOR

RELATED APPLICATIONS

This application claims divisional priority under 35 U.S.C. §§120 and 121 to the filing date of co-pending U.S. patent application Ser. No. 09/562,225 filed Apr. 28, 2000, and under 35 U.S.C. §119 to the filing date of U.S. Provisional Patent Application No. 60/132,497 filed on May 4, 1999.

BACKGROUND OF THE INVENTION

The present invention relates to systems for monitoring the fuel level in a vehicle. More particularly, the present invention relates to a system for optimizing refueling of a vehicle, reducing refueling fraud, and providing enhanced fuel information.

Vehicles such as tractor-trailer trucks transport enormous amounts of freight around the globe. Each year these trucks travel millions of miles and consume a correspondingly large amount of fuel. Because just one truck can consume tens of thousands of dollars in fuel, fuel costs make up a significant portion of the operating budget of trucking companies.

While fuel costs are significant, the methods used to control and monitor fuel consumption have remained unchanged for many years. Generally, the driver of each truck in a fleet maintains a manual log detailing the amount of fuel purchased, the cost of the fuel, and the mileage traveled between refueling stops. The driver also makes independent decisions on where and how to refuel the truck. Manual methods like these provide some ability to monitor and control fuel consumption, but are subject to variances inevitably introduced by human beings. Drivers may forget to make log entries or enter information incorrectly. Further, drivers are likely to refuel in random ways. Some drivers may refuel when the fuel level reaches one level such as one-quarter of a tank, others when the level reaches some other level such as one-eighth of a tank. Drivers are also unlikely to have current fuel price information at refueling stations along their route. Without this information, fuel is likely to be purchased at a price that is higher than the lowest available price.

Another problem with the manual methods noted above is their reliance on data from analog fuel level sensors. Most analog fuel sensors are electromechanical float devices that suffer from at least two deficiencies. First, they must be calibrated to the size of the tank in which they are installed. Second, they often register inaccurate readings due to changes in tank orientation such as might occur on inclines or when the vehicle rides over bumps. Of course, these devices provide only one type of information, a measurement of the percentage of fuel remaining in the tank: such as F, ¾, ½, ¼, E. Information such as the actual number of gallons remaining or the number of miles until the tank will be empty is not provided.

SUMMARY OF THE INVENTION

Accordingly, there is a need to provide a system that monitors fuel consumption, provides fuel consumption information, and makes refueling decisions for the driver to optimize fuel purchasing and consumption.

The present invention provides a system for monitoring fuel consumption and optimizing refueling of a vehicle. The system includes a fuel level sensor designed to be mounted on a fuel tank. The fuel level sensor has a transducer, such as an ultrasonic transducer, for generating a distance signal that represents the distance between the sensor and the surface of the fuel in the fuel tank. A processor is coupled to the transducer, and is programmed to convert the distance signal to a percentage of capacity signal, calculate the volume of fuel within the fuel tank, and create a message that includes information regarding the volume of fuel in the fuel tank.

The processor of the fuel level sensor is coupled to a vehicle information system that may include information buses and modules such as an on-board computer. The vehicle information system provides the processor with various data including the distance traveled by the vehicle. The processor is coupled through a network to a fuel optimization server that calculates an optimal location for refilling the fuel tank using the message created by the fuel level sensor, data provided by the vehicle information system, and information it receives from a fuel-price-by location service, and a dispatch terminal. The fuel optimization server relays the optimal location for refueling to the vehicle information system and a display or computer coupled to the vehicle information system then displays the refueling information to inform the driver when and where to refuel. Other non-fuel related information (such as engine performance data from the J1587 bus) can also be transmitted from the vehicle to the dispatch terminal to allow scheduling of routine maintenance or detection of developing engine problems.

The computing power of the invention permits the generation of numerous other types of fuel-related information. For example, the processor may be programmed to calculate a signal indicative of the number of miles-to-empty (hereinafter "miles-to-empty signal"), and provide that miles-to-empty signal to the dispatch terminal as well as to the vehicle driver. This type of information provides drivers more flexibility to plan refueling stops than standard fuel measurement systems which, in general, merely display the amount of fuel remaining in a tank on an analog gauge mounted in the vehicle.

Another feature of the present invention is that it measures and calculates fuel-related information with a level of accuracy not achieved heretofore. The fuel level sensor used in the system may include a vehicle-speed-dependent filter to reduce the measurement affects of standing waves in the fuel tank caused by vehicle motion. Another interesting feature of the present invention is that it may automatically calculate the size of the fuel tank with which it is used.

Several methods are encompassed by the teachings of the present invention. One of them relates to a method of calculating a miles-to-empty value for a fuel tank in a vehicle. According to the method, a percentage of capacity value is acquired from a fuel level sensor mounted on the fuel tank. A total fuel capacity value that has been preprogrammed into the sensor is retrieved from memory. Alternatively, the sensor calculates a total fuel capacity value. A fuel economy value is then calculated. A fuel remaining value is determined by multiplying the percentage of capacity value by the total fuel capacity value. Finally, a miles-to-empty value is determined by multiplying the fuel remaining value by the fuel economy value. Using other methods of the present invention, a miles-to-empty value may be determined based on the vehicle distance traveled. Still other methods relate to calculating the size of a fuel tank based on the distance traveled by the vehicle or the relative hours of fuel consumption and the fuel flow rate. Additional methods taught by the invention include determining the hours until the tank is empty, identifying a leak in a tank, and identifying refueling fraud.

These and other features of the invention will become apparent upon consideration of the following detailed description and accompanying drawings of the embodiments of the invention described below.

BRIEF DESCRIPTION OF THE DRAWINGS

FIG. 3A is a block diagram of another embodiment of the fuel optimization system.

FIG. 6 is a block diagram of the control circuitry for the fuel level sensor of FIGS. 4 and 5.

FIG. 7 is a schematic illustration of the measurement made by the fuel sensor of FIGS. 4 and 5.

FIG. 8 is a circuit diagram of the micro-controller shown in FIG. 6.

FIG. 8A is a circuit diagram of the analog driving circuit shown in FIG. 6.

FIG. 9 is a flow chart of the top-level architecture of the software run on the processor of the fuel level sensor of FIGS. 4 and 5.

FIG. 15 is a flowchart of the pulse send and receive routine implemented by the software of the fuel level sensor.

FIG. 16 is a flow chart of the maintenance processing implemented by the software of the fuel level sensor.

FIG. 17 is flow chart of the median filtering implemented by the software of the fuel level sensor.

FIG. 18 is a flow chart of the finite impulse response filtering implemented by the software of the fuel level sensor.

FIG. 19 is a flow chart of the conversion process implemented by the software of the fuel level sensor.

DETAILED DESCRIPTION OF THE PREFERRED EMBODIMENTS

Figure 1:
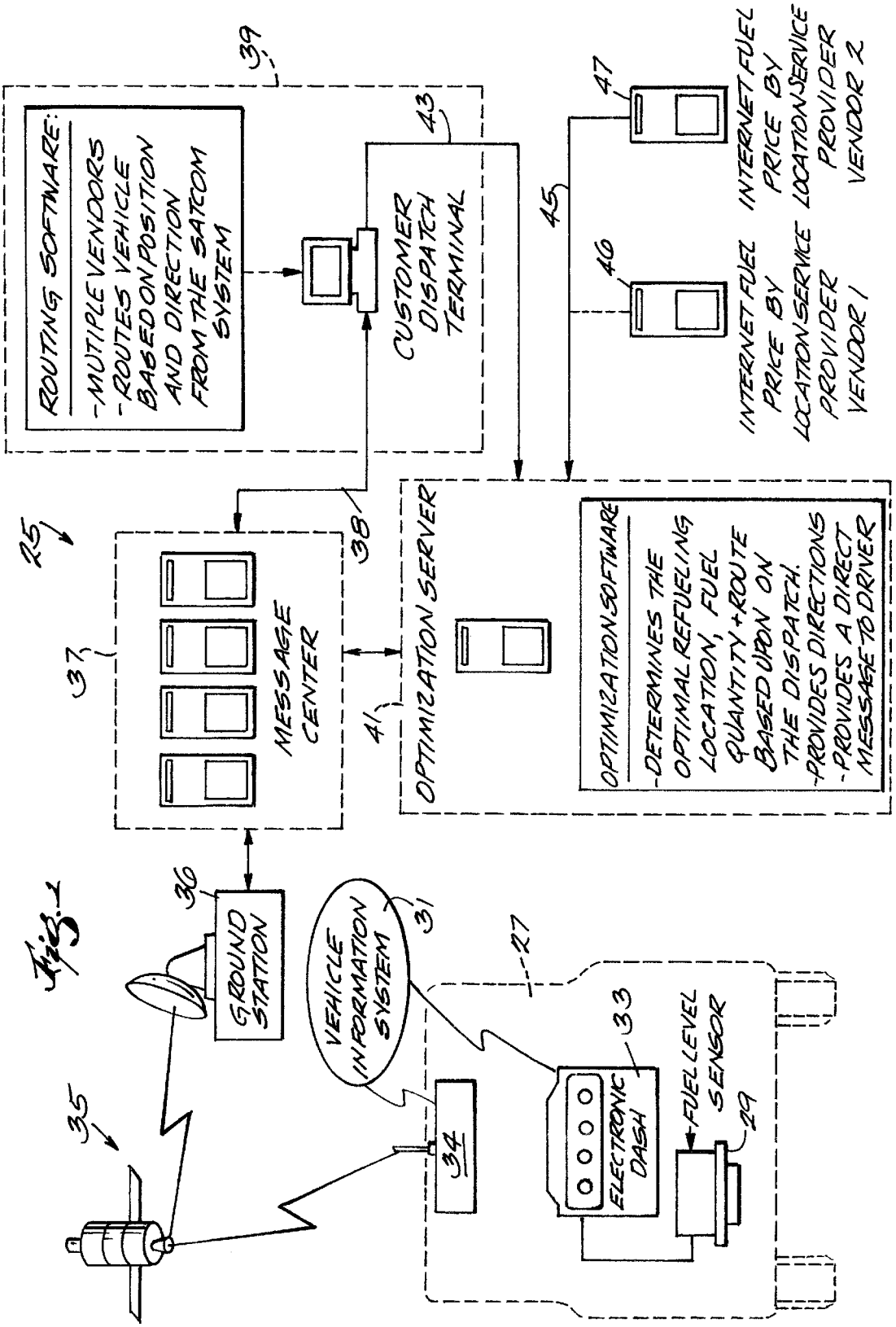
FIG. 1 is a block diagram of a fuel optimization system embodying the invention.

A system 25 embodying the invention is shown in FIG. 1. The system includes a vehicle 27 (such as a tractor-trailer truck) equipped with a fuel sensor 29, and a vehicle information system 31. As used herein, the term vehicle information system refers to the sensors, processors, and communication links present in the vehicle 27. For example, a modern vehicle may include brake sensors, engine sensors, transmission sensors, other sensors, and a GPS (global positioning system) unit. Each of these devices may communicate with controllers or modules designed to control or monitor various aspects of vehicle operation on a vehicle bus or network. The modules may communicate with each other on the same bus or network. Preferably, the invention is compatible with present bus and network communication schemes so that it may exchange information with the vehicle information system. Obviously, as communication schemes are changed in the future it is envisioned that the invention could be readily updated by those of ordinary skill in the art to work with such improvements. Further, since vehicle information system technology is known, the details of the vehicle information system 31 are not discussed in detail.

The vehicle information system 31 is coupled to an electronic dash display 33, and to a transmitter/receiver or transponder 34. The transponder 34 is coupled to a network 35, such as a satellite network. As shown in FIG. 1, the network 35 includes a ground station 36 and message center 37. The message center 37 receives information from the fuel level sensor 29 and vehicle information system 31 on the vehicle 27 via the network 35. The message center 37 delivers information such as vehicle status and location to a dispatch terminal 39 through a second network 38. As used herein, the term "dispatch terminal" is used to refer to a node or location, without regard to any physical structure, that is capable of providing the functions described herein as being associated with a dispatch terminal. The dispatch terminal 39 could correspond to an actual dispatch terminal of a trucking company, but the expression is not to be limited to such a specific example.

The message center 37 also relays information such as fuel quantity, location, fuel economy, and fuel tank size to a fuel optimization server 41 through a third network 42. The dispatch terminal 39 determines vehicle routing information based on the information it receives from the message center 37. The fuel optimization server 41 receives routing information from the dispatch terminal 39 through a fourth network 43. The fuel optimization server 41 also receives fuel-price-by-location information through a fifth network 45 from one or more fuel-price-by-location services 46 and 47, such as the service offered by Opis Transportation through its site at www.opisretaildiesel.com. It should be noted that the second network 38, third network 42, fourth network 43, and fifth network 45 are meant to encompass communications links in general, including telephone, wireless, Internet, and various other connection mechanisms.

Figure 2:
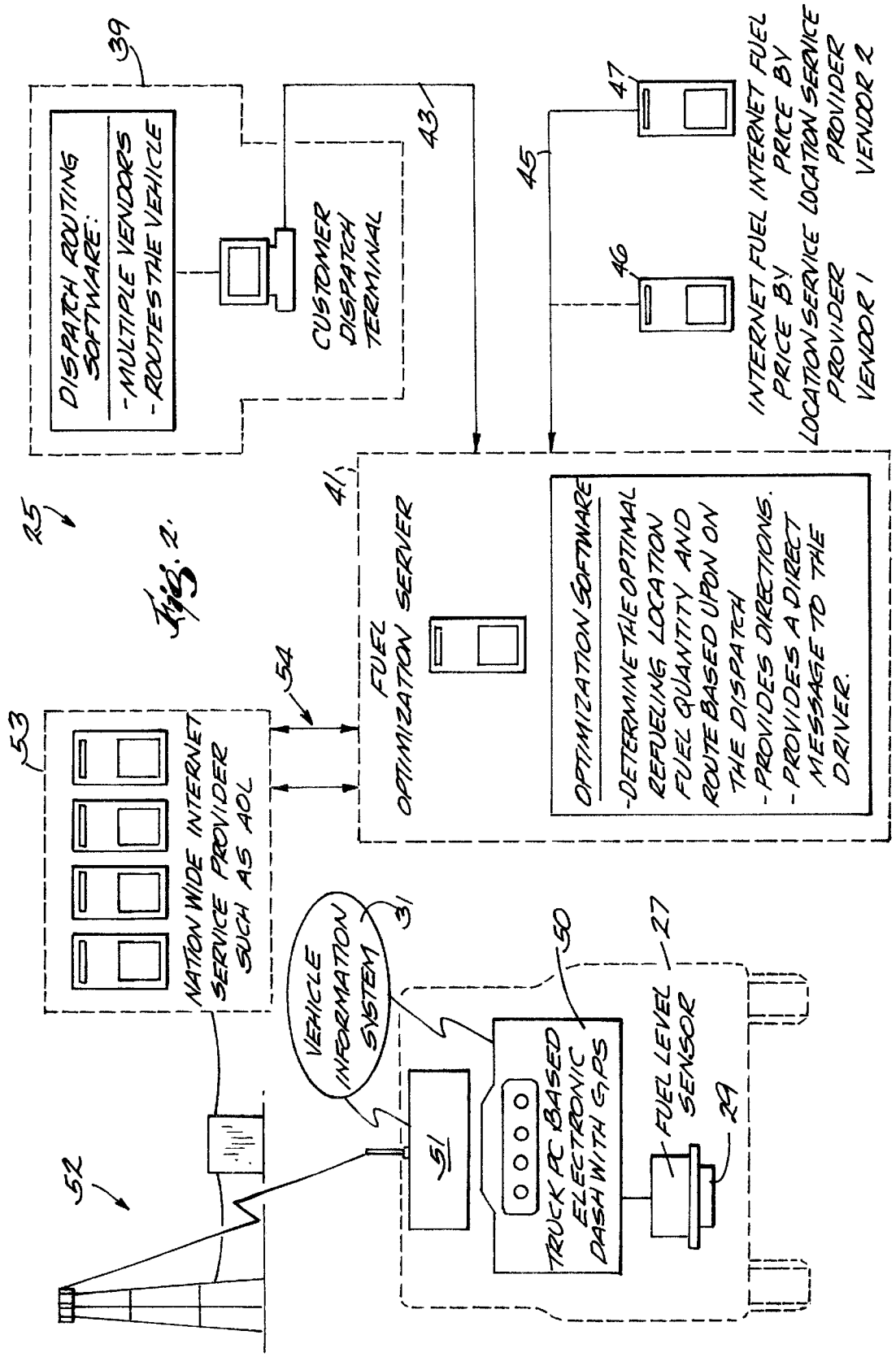
FIG. 2 is a block diagram of another embodiment of the fuel optimization system.
Figure 3:
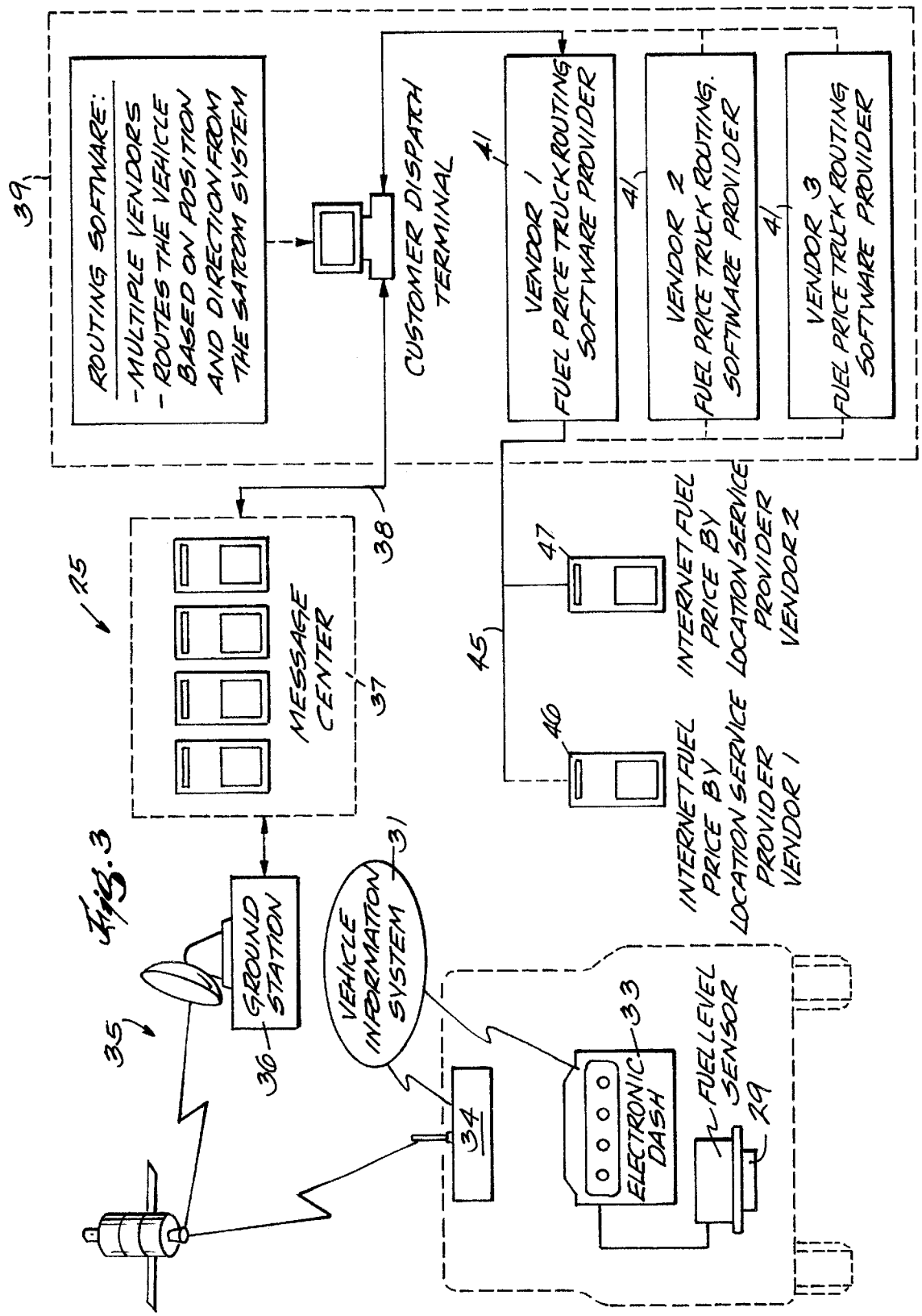
FIG. 3 is a block diagram of another embodiment of the fuel optimization system.

In addition to the embodiment shown in FIG. 1, the invention may be implemented in many alternative forms. A second embodiment of the invention is shown in FIG. 2. Instead of using a satellite-communications system, the embodiment of FIG. 2 is based on a cellular or wireless communications system. In particular, the vehicle 27 is equipped with a vehicle PC (computer) and electronic dash unit 50, preferably equipped with a GPS navigation system, and a cellular modem 51 that is coupled to a cellular system 52. The cellular system 52 is linked to an Internet service provider ("ISP") 53. The fuel optimization server 41 and ISP 53 exchange information through a link 54. FIG. 3 shows yet another embodiment of the invention where the functionality of the fuel optimization server is provided within the dispatch terminal 39. FIG. 3A shows an embodiment that combines features of the embodiments shown in FIGS. 2 and 3.

Regardless of the exact configuration used, the system 25 is designed to collect information regarding the fuel level in a vehicle fuel tank (not shown) using the fuel level sensor 29. The fuel level sensor 29 places that information on a vehicle bus and the information is transmitted to other components in the system. More particularly, the fuel optimization server 41 monitors the vehicle 27 for a low fuel message and monitors the dispatch terminal 39 for a dispatch command. In response to either of these messages, the system interrogates the fuel level sensor 29 for tank capacity, fuel quantity, and fuel economy information. Based on the information provided by the fuel level sensor, the current routing dispatch generated by the dispatch terminal 39, fuel price information from the fuel-price-by-location service provider 46 or 47, tax information, and preference information the fuel optimization server 41 develops an optimal routing, refueling location or locations, refueling quantity, and direction (or heading) listing for the driver of the vehicle 27. The listing of information is transferred to the vehicle 27 and displayed on the dash or vehicle PC display for viewing by the driver. Many other aspects and advantages of the system 25 are addressed below.

Figure 4:
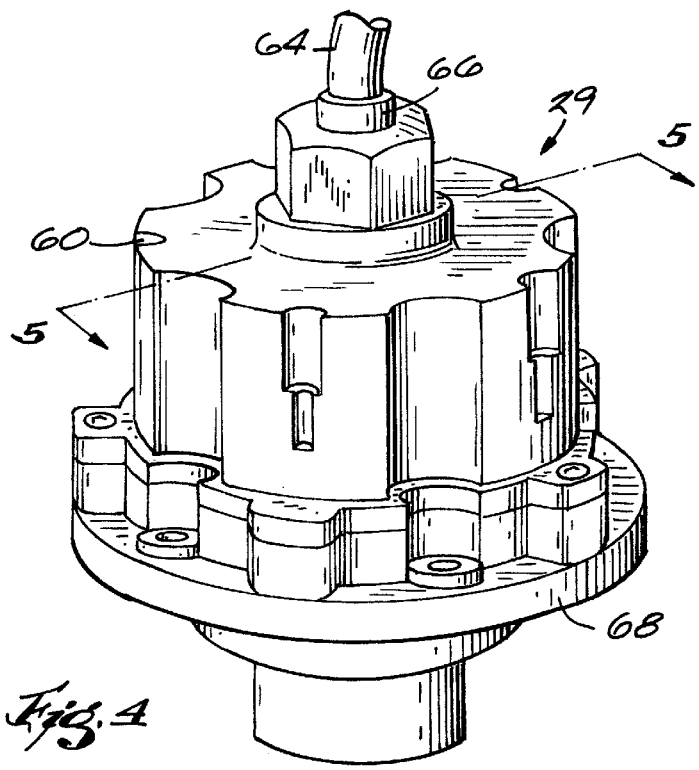
FIG. 4 is a perspective view of a fuel level sensor embodying the invention.
Figure 5:
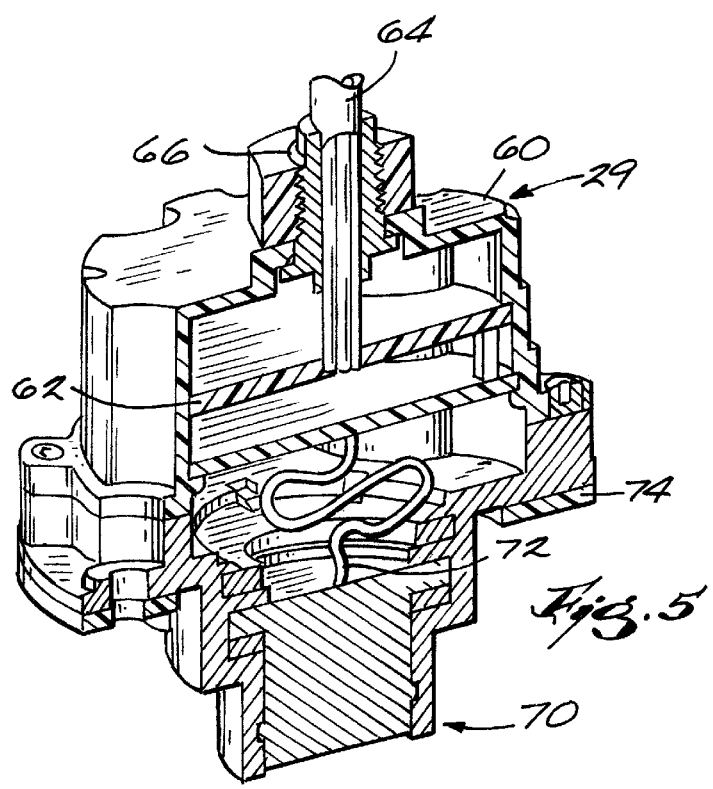
FIG. 5 is a cross-sectional view of the fuel level sensor of FIG. 4 taken along the line 5—5.

As best seen by reference to FIGS. 4 and 5, the fuel level sensor 29 includes a main housing 60 that contains a circuit board assembly 62 with a processor (discussed below). The processor communicates (sends and receives information) with the vehicle information system 31 through a cable assembly 64 inserted through an opening 66 of the main housing 60. The main housing 60 is mounted on a base housing 68 which holds a transducer 70 that is coupled to the processor (discussed below) on the circuit board assembly 62 through a communication link 72. The base housing is designed to be inserted into an opening in the vehicle fuel tank (not shown) and includes a tank seal gasket 74 to help ensure a liquid tight seal between the opening and the sensor 29.

The main function of the fuel level sensor is to determine the amount of fuel remaining in the fuel tank of the vehicle 27. A circuit assembly or system 90 within the sensor that accomplishes this and other tasks is shown in FIG. 6. The system 90 includes a micro-controller or processor 92 (that, although not shown, is mounted on the circuit board assembly 62.) The processor 92 sends a command signal to a transmitter 94. The transmitter in turn sends a pulse signal to the transducer 70, which converts the electric pulse signal to a short pulse of sound PS (FIG. 7). As best seen by reference to FIG. 7, the pulse of sound PS is reflected off the surface S of the fuel in the fuel tank (not shown) of the vehicle 27. The return of the pulse of sound is sensed by a receiver 96 (FIG. 6) and the time needed for the sound to make the round trip, referred to as the time of flight (TOF), is recorded by the processor 92. As will be discussed in greater detail below, the processor 92 processes the TOF measurement and generates a digital output on lines 98 that are coupled to the vehicle information system 31. Ultimately, the output is transmitted as a message or messages to the dispatch terminal 39. The processor 92 also generates a signal, preferably a pulse-width modulated (PWM signal) representative of the fuel level in the fuel tank. This signal is sent along link 100 to an amplifier 104 that drives a standard analog fuel gauge (not shown). The system 90 is powered by a power supply 106 that delivers electric energy to the system components through an interference filter 108.

The processor 92 may be implemented in multiple forms. Of course, the processor's main function is to execute software that carries out the desired fuel calculations and to communicate with other devices in and out of the vehicle. Preferably, the processor is implemented in a simple and inexpensive form.

One form of the processor 92 is shown in FIG. 8. In this embodiment, the processor includes an echo signal or first sub-processor 110. The first sub-processor 110, as will be discussed in greater detail below, sends a command signal that drives transmitter 94 over trigger line TRIG. and receives a signal from the receiver 96 over detect line DET. As shown in FIG. 8A, the trigger command is delivered to a transformer driver circuit 112 that controls a transformer 113. The transformer driver circuit 112 supplies a voltage signal across the primary coil of the transformer 113. The voltage signal is stepped up across the secondary coil, rectified by a rectifier 113A, and output to the transducer across nodes A1 and A2. The echo signal from the transducer is delivered to a pre-amplifier 114, which provides suitable input and output impedances, and amplified again through a final amplifier 115. The output of the final amplifier 115 is rectified by a rectifying device 115A and delivered to a demodulator and detector 116. The demodulator and detector 116 delivers a detect signal representing the echo signal from the transducer to the processor 92 over the DET line. In addition to receiving the detect signal over the DET line, the sub-processor 110 (FIG. 8) receives a reset signal from a second sub-processor (discussed below) through line CRESET (FIG. 8). Calibration data is received from a memory 118. A temperature sensor 119 provides temperature data to allow the sub-processor 110 to account for changes in the speed of sound caused by fluctuations in the environmental temperature. By accounting for temperature changes, the sub-processor 110 may accurately determine the TOF measurement. Additional information, including input regarding the size of the tank of the vehicle, may be received through the select lines SEL1–SEL3.

Once the first sub-processor 110 is reset and calibrated and has received its input data, the sub-processor 110 implements an echo signal processing routine and generates a percentage of capacity signal over the lines DAT0–DAT9. The percentage of capacity signal sent over lines DAT0–DAT9 is processed by a personality or second sub-processor 120. The second sub-processor 120 receives reset commands from a reset controller 121. The second-sub processor may also be programmed with information such as the size of the fuel tank of the vehicle and the configuration of the analog fuel gauge of the vehicle at a vehicle programming station or through another input mechanism. The second sub-processor 120 stores this information in a memory 122 for use in subsequent calculations. These calculations include converting the percentage of capacity information received from the first-sub-processor into other values, such as the number of gallons remaining in the tank. The calculations also involve generating an appropriate signal to drive an analog fuel gauge. The second sub-processor 120 outputs an analog fuel gauge drive signal over the line REO/ALE and generates a digital output along line RA5/TX/CK. The digital output is subsequently encoded (preferably for RS485-type communications) by an encoder/decoder or driver 124. The driver 124 generates an output signal on the line ^DO/R and receives input on the line DO/R. The lines ^DO/R and DO/R are used to communicate over the data bus in the vehicle information system 31 with the transponder 34 or vehicle PC 50, as the case may be. The processor 92 shown in FIG. 8 and the driving and detection components shown in FIG. 8A are powered by a power supply (not shown) of conventional design.

Figure 8B:
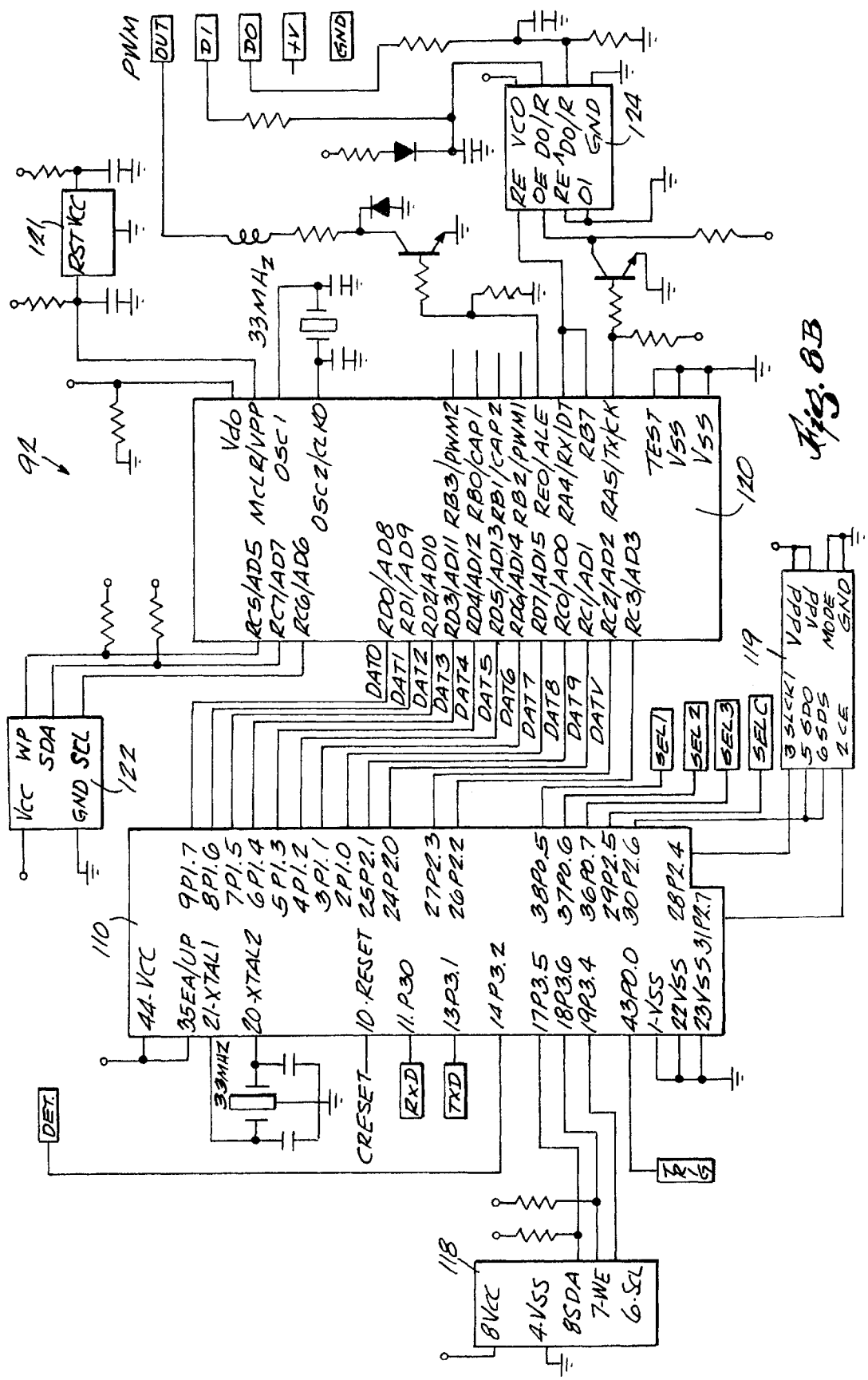
FIG. 8B is a circuit diagram of a second embodiment of the micro-controller shown in FIG. 6.
Figure 8C:
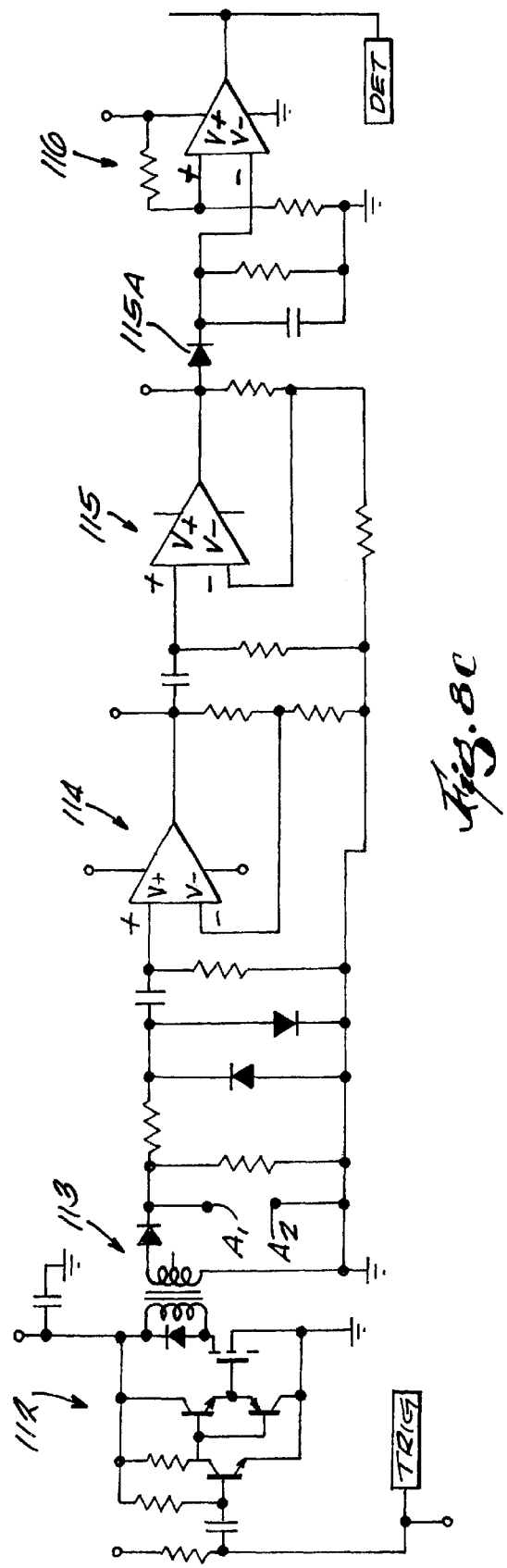
FIG. 8C is a circuit diagram of second embodiment of the analog driving circuit shown in FIG. 6.
Figure 8D:
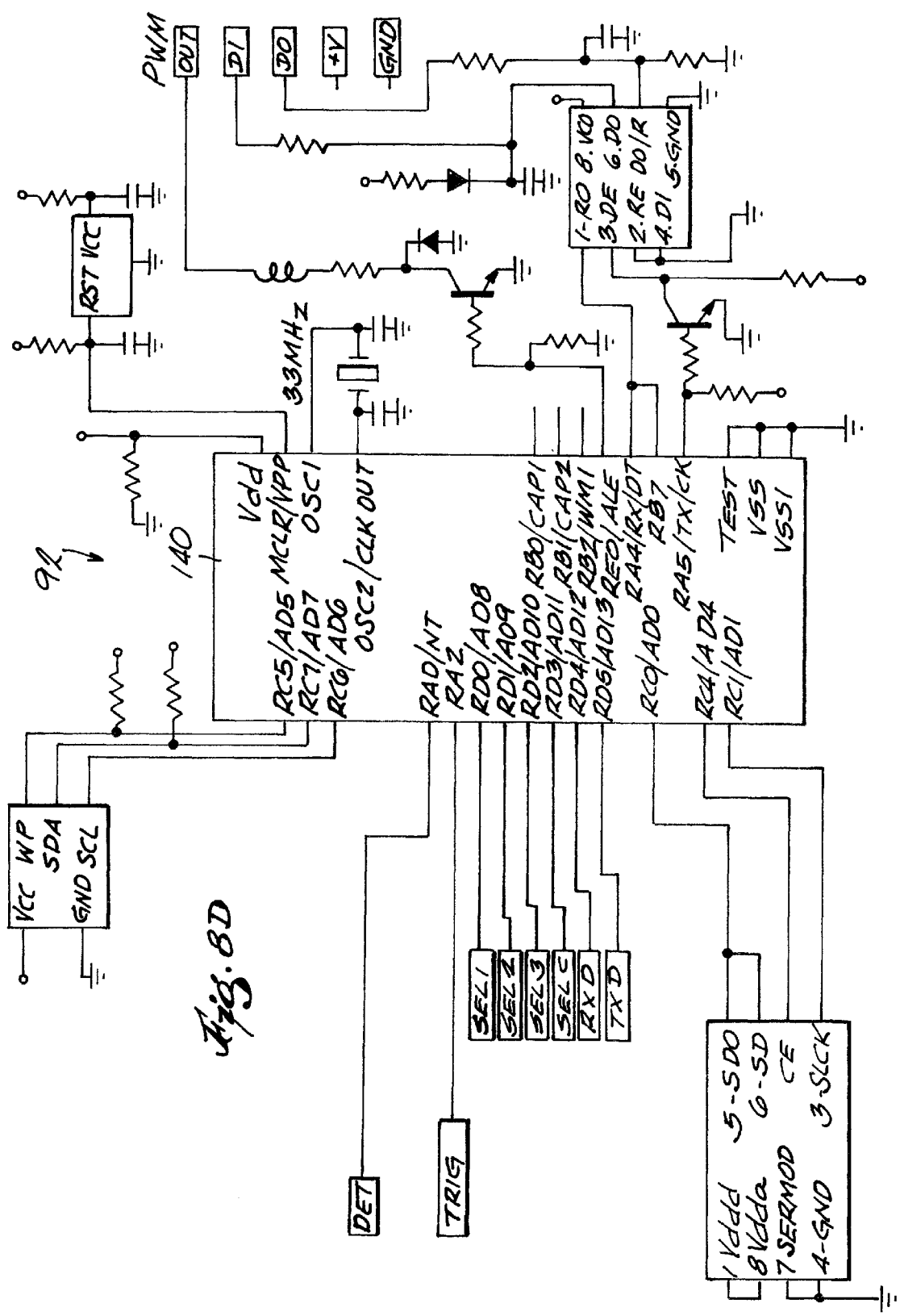
FIG. 8D is a circuit diagram of a third embodiment of the processor shown in FIG. 6.

While the designs illustrated in FIGS. 8 and 8A are functional, it is believed by the inventor(s) that an improved system may be obtained using other components. For example, FIGS. 8B and 8C illustrate a first modified version of the system 90. FIG. 8B illustrates an embodiment of the processor where the sub-processor 120 is operated at a clock speed of 33 MHz, thereby eliminating the need for the 16 MHz oscillator used in the embodiment shown in FIG. 8. FIG. 8C illustrates a modified version of the transducer driver where the pre-amplifier and final amplifier each consists of one-half of an operational amplifier. FIG. 8D illustrates a second modified version of the system 90. In FIG. 8D the sub-processor 110 and 120 are implemented on a single chip 140, such as a PIC17C44 from Microchip Technology, Inc. The embodiment shown in FIG. 8D may be implemented with the transducer driver shown in FIG. 8C.

Regardless of the hardware used to implement the system 90, the functions of the system remain essentially the same. Accordingly, the remainder of the description of the invention will discuss the embodiment illustrated in FIGS. 8 and 8A, with a focus on the architecture of the software installed on sub-processors 110 and 120. It should be recognized that one of ordinary skill in the art could readily modify the software described herein to run on the single chip embodiment shown in FIG. 8D.

As best seen by reference to FIG. 9, the processor 92, as embodied in the sub-processor 110 and 120, for example, receives input in the form of reset commands, detection signals from the transducer 70, input regarding tank configuration (such as through select lines), temperature data, and calibration data. After processing this data, the processor 90 generates a signal to drive an analog fuel gauge and a message signal containing fuel level information, which is delivered to the optimization server 41 upon the occurrence of a dispatch command from the dispatch terminal 39 or a low fuel condition. The process begins in the sub-processor 110 with an initialization step 200 where the system is powered-up. Following the initialization step 200, background processing 205 and foreground processing 210 are accomplished.

Figure 10:
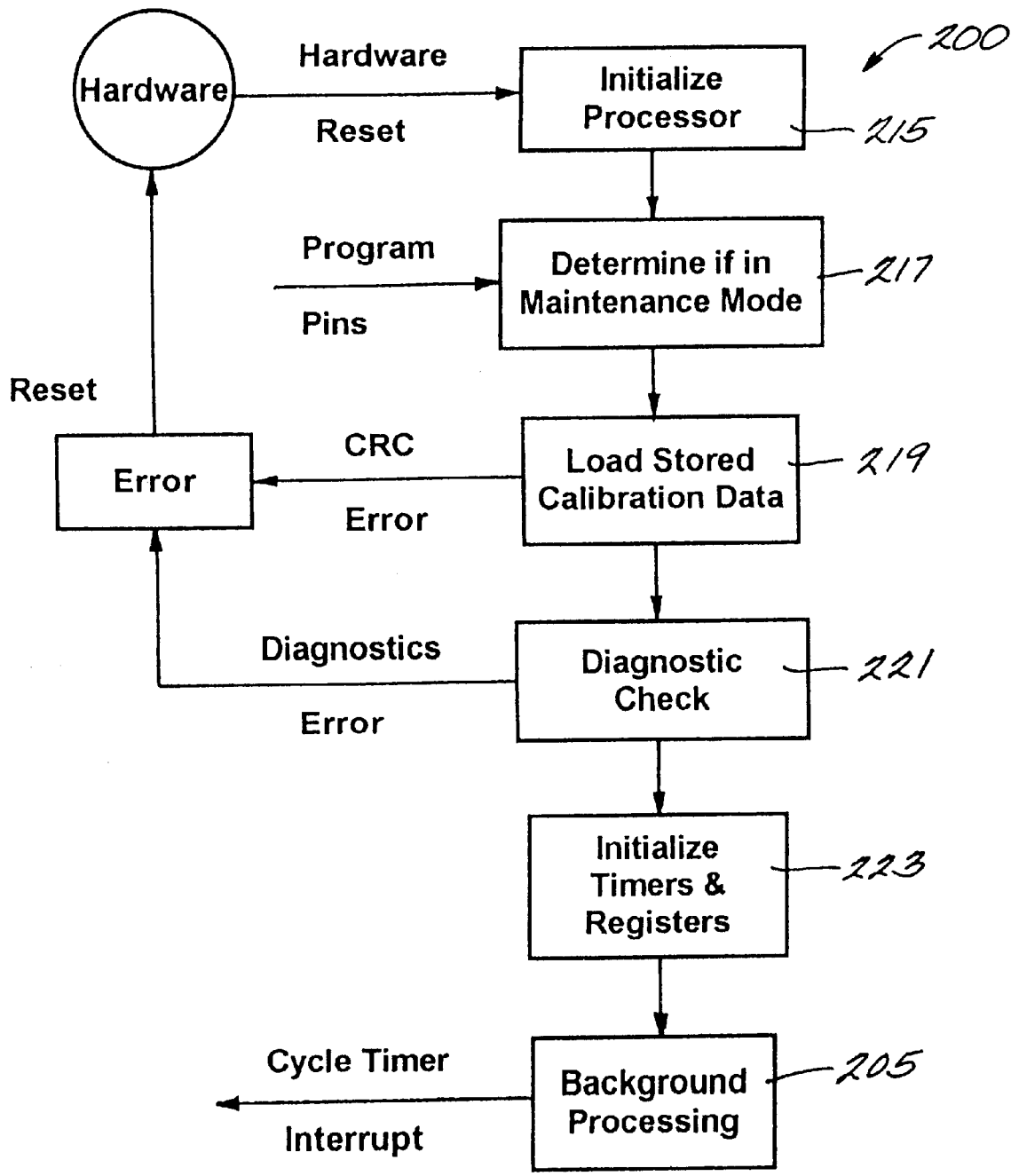
FIG. 10 is a flow chart of the initialization sequence implemented by the software of the fuel level sensor.
Figure 11A:
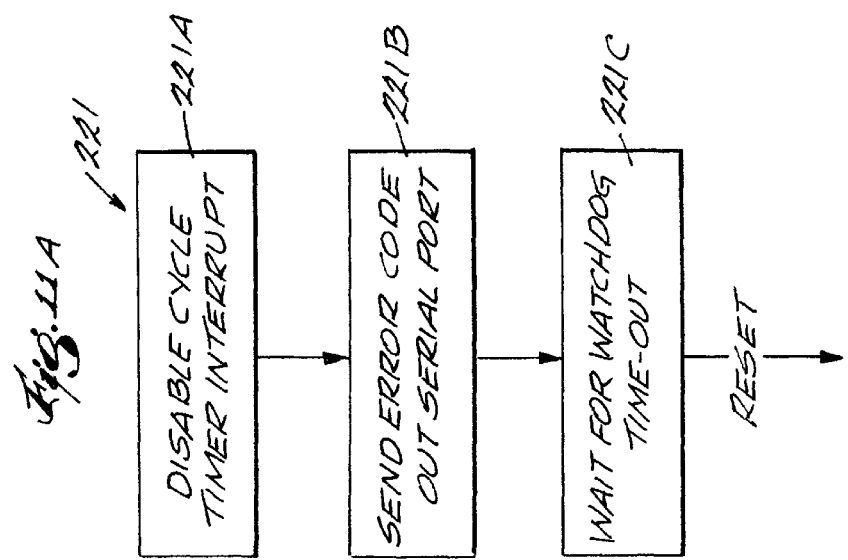
FIG. 11A is a flowchart of the error handling process implemented by the software of the fuel level sensor.
Figure 11:
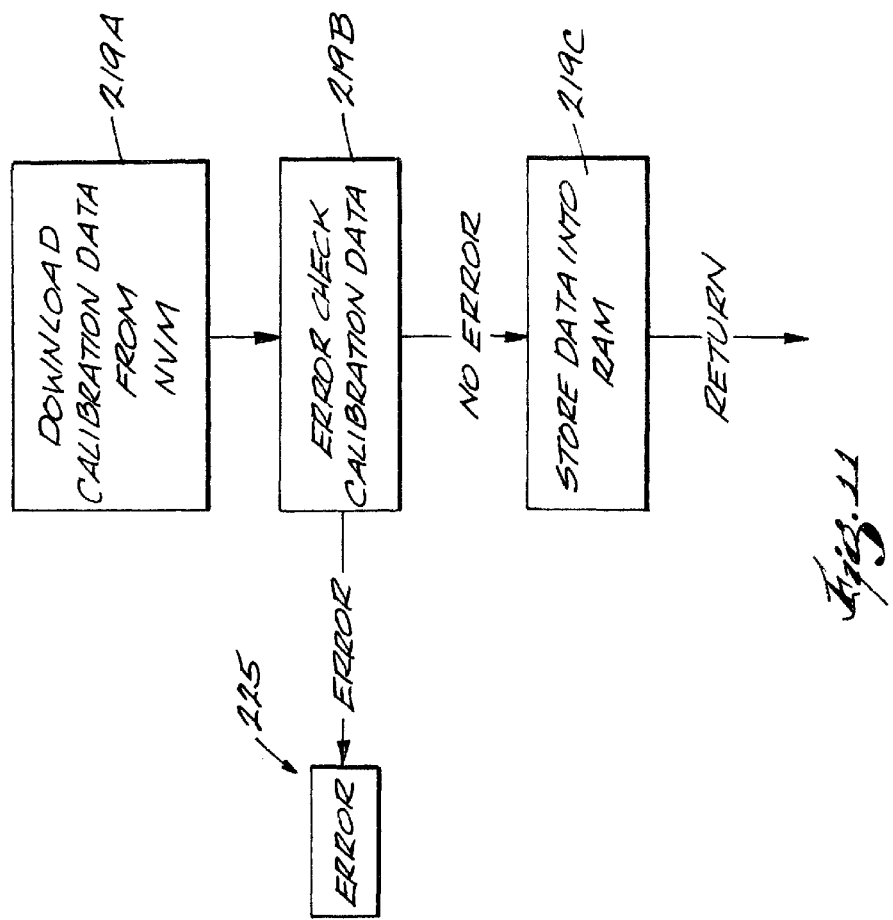
FIG. 11 is a flow chart of the calibration process implemented by the software of the fuel level sensor.

The initialization step 200 involves a hardware reset process beginning with initializing of the processor at 215. The select lines (SELC, for example) are read at 217 in order to determine whether the processor 92 is in maintenance mode. If the processor 92 is in a maintenance mode, the processor will process a maintenance command in addition to making a measurement. Loading of calibration data occurs at 219. As best seen by reference to FIG. 11, the calibration data is down loaded from memory at 219A, and is checked for validity at 219B. If the calibration data is valid, it is stored in RAM at 219C. If the calibration data is invalid or otherwise erroneous, the sub processor 110 executes an error handling routine 221 (FIG. 11A). First, the sub processor 110 disables the cycle timer interrupt at 221A. It then sends an error code to the serial port (as shown at step 221B) for output to a peripheral device. Finally, the sub processor waits for time-out of the watchdog at 221C and begins initialization again. Once the calibration data is loaded, a diagnostics check is implemented at step 221. System timers are initialized at 223 (FIG. 10). Background processing 205 then proceeds.

Figure 12:
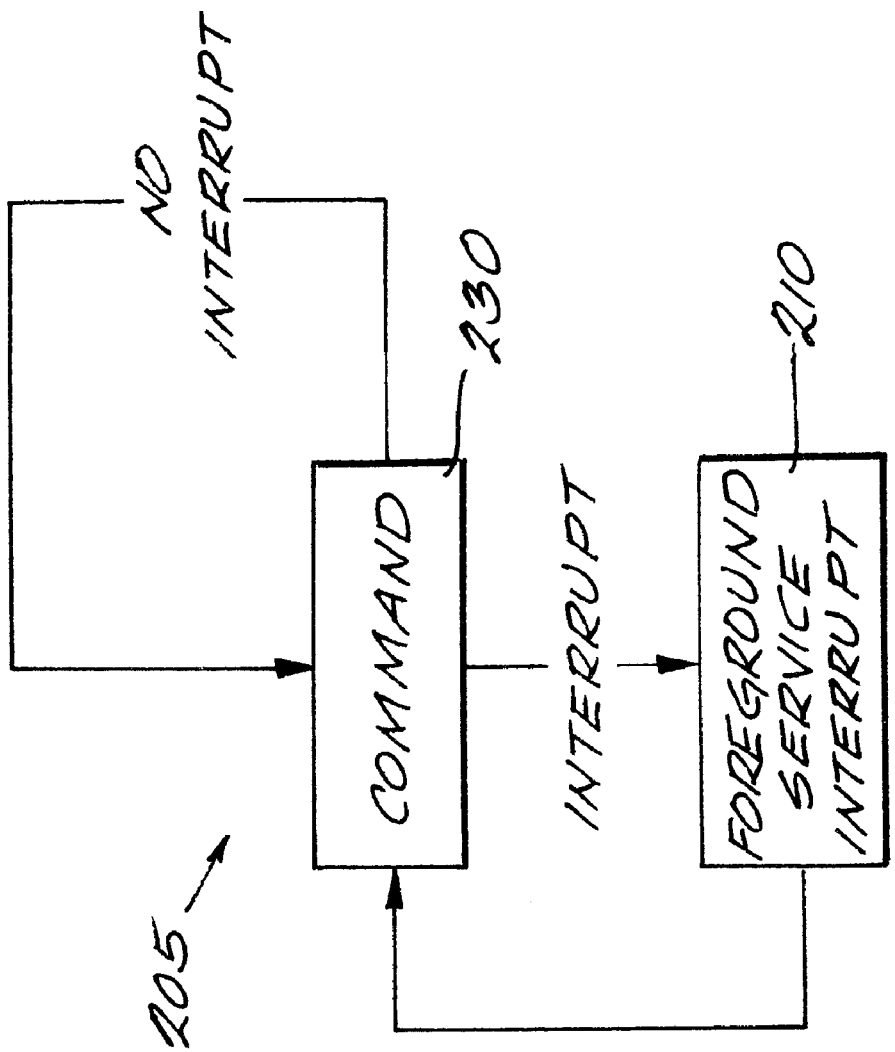
FIG. 12 is a flow chart of the background process implemented by the software of the fuel level sensor.
Figure 13:
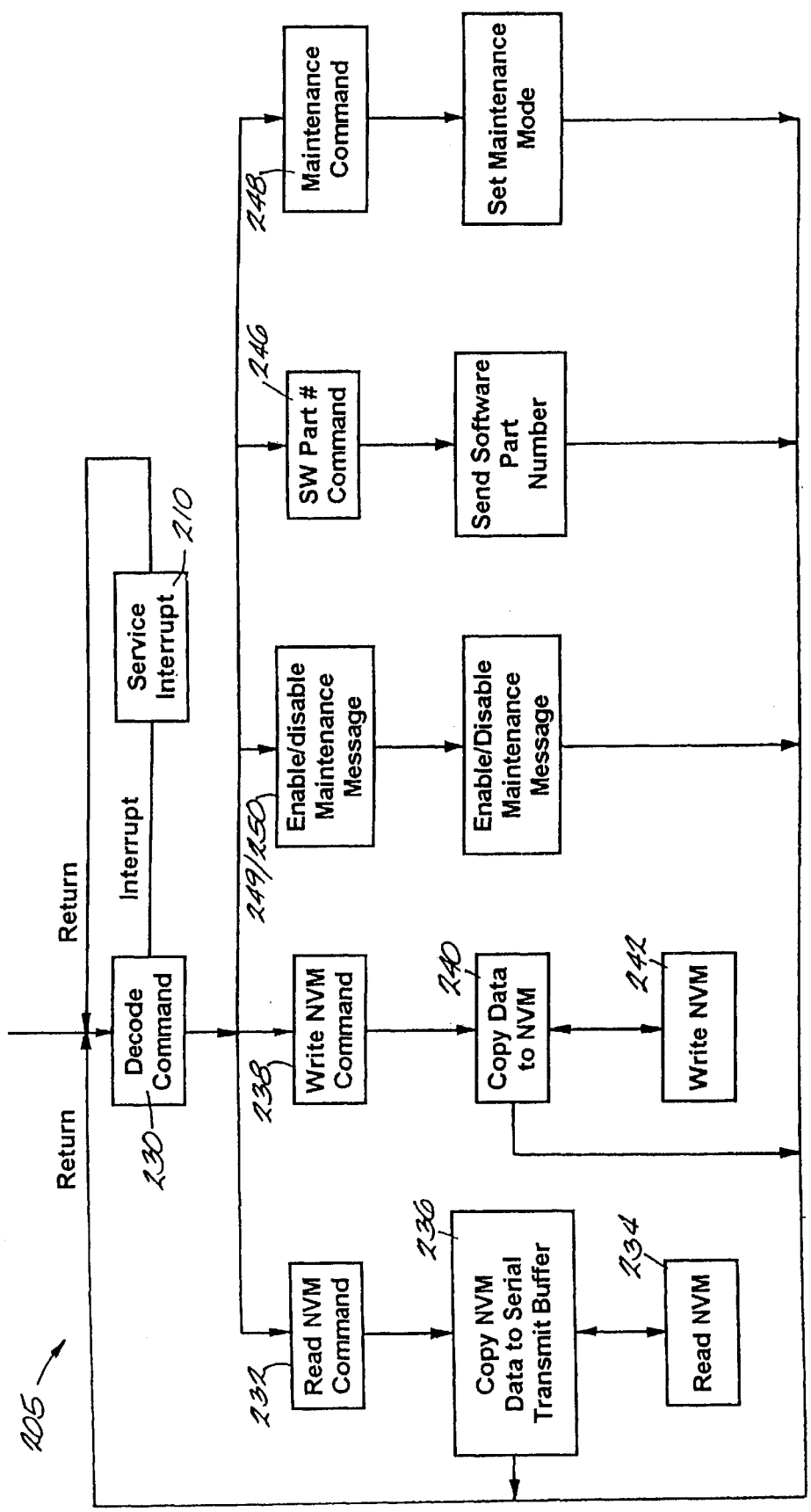
FIG. 13 is a flow chart of the command processing implemented by the software of the fuel level sensor.

As best seen by reference to FIGS. 12 and 13, the background processing 205 involves decoding commands at 230. Command signals are delivered through the select lines (SEL C, for example) by a user, if desired, for diagnostic and other maintenance purposes. The software supports several commands such as a read from memory command 232, which involves reading data at 234 and copying the data to a serial transmit buffer at 236. Typically, this command is used to read stored TOF measurements, temperature readings, and calibration parameters. The software also supports a write to memory command 238, that involves copying data to memory at 240, and then writing to memory at 242. A send software number command 246 supports debugging and other programming diagnostics. A maintenance command 248, as its name indicates, supports maintenance. The processor 92 must receive an enable message 249 before maintenance can be carried out. A disable message 250 is used to terminate maintenance activities.

Figure 14:
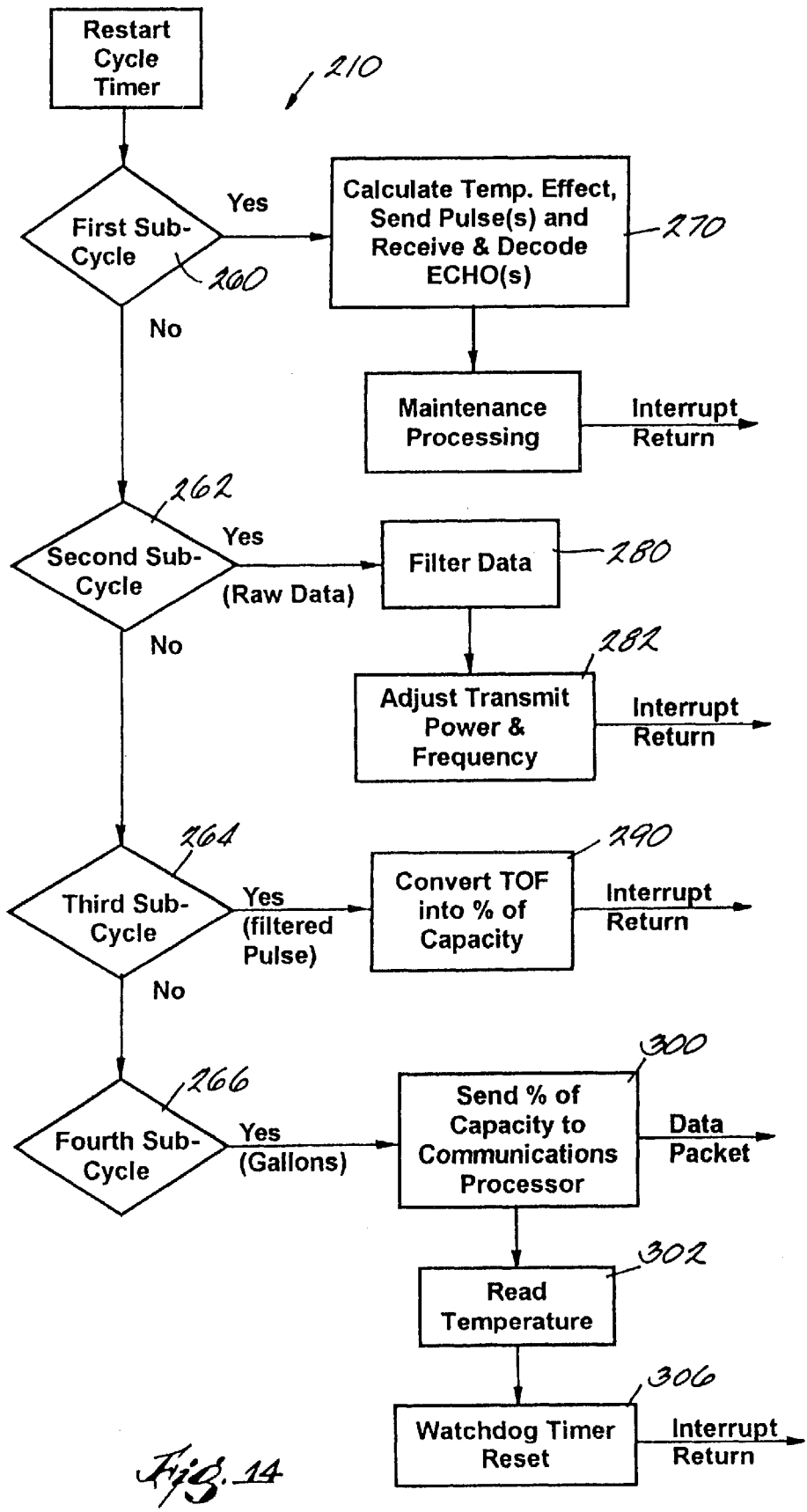
FIG. 14 is a flow chart of the interrupt handler implemented by the software of the fuel level sensor.

The system 90 is designed such that a foreground service interrupt occurs periodically, such as every 12.5 milliseconds. Once the interrupt is complete, background processing 205 continues. Each time an interrupt occurs foreground processing is carried out. Foreground processing 210 involves four sub-cycles 260, 262, 264, and 266 (FIG. 14). On the first interrupt at step 270 (i.e., at the beginning of sub-cycle 260), the processor 92 compensates for temperature changes, the transducer is instructed to send a variable pulse train, the processor 92 decodes the echoes received, and a TOF measurement is recorded. As seen in FIG. 15, the sending and receiving of a pulse involves starting the pulse timer at 270A, sending a variable pulse train to the transducer at 270B, waiting for an echo at 270C, and recording the elapsed time at 270D. The generation of a sound wave and detection of an echo may be done in such a manner to permit near field measurements. When near field conditions are taken into consideration, the amplitude, number, and frequency of drive pulses are adjusted to compensate for part-to-part variation, ambient conditions (e.g., temperature and humidity), and target composition. The detection for decoding of echoes is accomplished by compensating for transducer ring time and determining the time difference between adjacent echoes. Once the TOF measurement is recorded, maintenance processing 272 is instituted so that if a maintenance command (such as an enable message command 244) is received, information from the sub-processor will be available in a readily understood format such as RS-232. As shown in FIG. 16, maintenance processing involves formatting steps 272A–272I, where the tank size, temperature, table identification, echo time, filtered echo time, distance, percent of capacity, number of echo detections, and temperature validation information are formatted for maintenance and diagnostic operations. Once the maintenance processing is complete, the interrupt returns control to the background processing 205.

At the next interrupt (i.e., sub-cycle 262) the TOF measurement may be filtered at step 280 and the power and frequency of the pulse train may be adjusted at step 282, in accordance with the guidelines noted above. Preferably, the filtering is done continuously. As best seen in FIG. 17, filtering involves saving the TOF measurement at 284A, ordering the accumulated TOF measurement at 284B, and selecting the median value from the ordered buffer at 284C. Filtering may also involve converting the TOF median to a distance measurement at step 286A and performing a weighted exponential multiplication on a predetermined group of past median values, such as the last 52 measurements, at 286B (FIG. 18).

Figure 21:
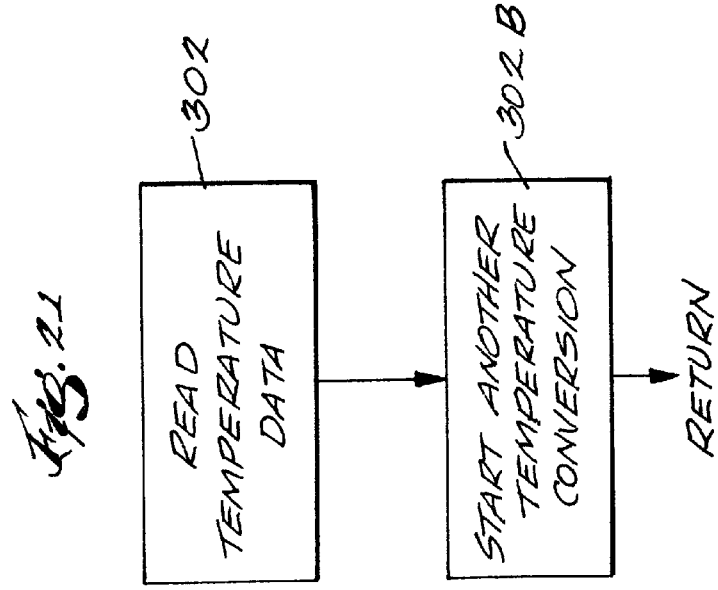
FIG. 21 is a flow chart of the temperature processing implemented by the software of the fuel level sensor.
Figure 20:
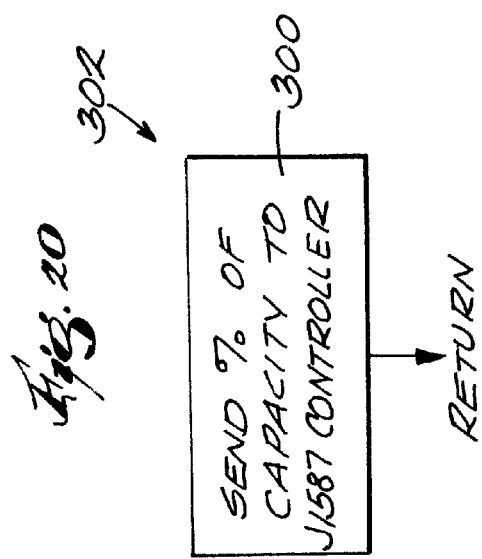
FIG. 20 a flow chart of the message transmission process implemented by the software of the fuel level sensor.

During the third interrupt (i.e., sub-cycle 264 in FIG. 14), the TOF measurement or filtered value (if filtering is used) is converted from inches (the distance measurement) into a percentage of capacity amount, as shown at 290. The conversion process (FIG. 19) involves retrieving the tank configuration at 292, retrieving interpolation values from a stored table at 294 and performing an interpolation based on the tank size and TOF measurement at 296. The percentage of capacity amount is sent to the second sub-controller 110 at a transmission step 300 (FIGS. 14 and 20). Following the transmission step 300, the temperature is read at 302 from the sensor 112. Once the temperature is read, the system is readied to read the next temperature at 302B (FIG. 21). Following temperature processing, the watch dog timer 306 checks system activity. The watch dog timer 306 disables the processor 92 and resets itself if a malfunction is detected.

Figure 22:
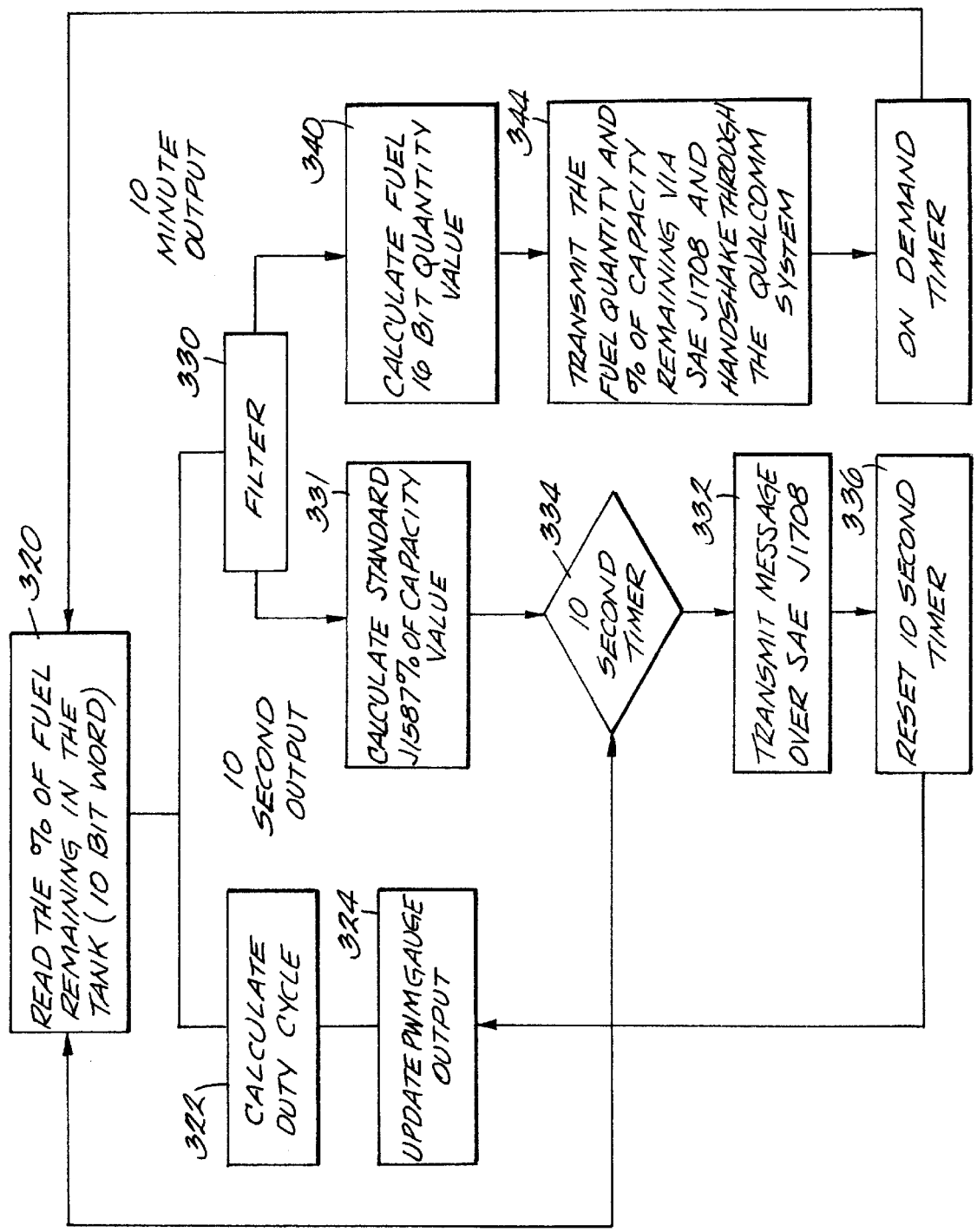
FIG. 22 is a flow chart of the bus transmission process implemented by the software of the fuel level sensor.

As best seen by reference to FIG. 22, the sub-processor 120 further processes the percentage of capacity amount 290 to forms that are compatible with analog fuel gauges, the vehicle information system 31, and the transponder 34.

The sub-processor 120 reads at 320, the percentage of capacity amount 290. The sub-process 120 calculates a duty cycle at 322 and then updates the PWM output to the gauge at 324. Simultaneously, the subprocessor 120 processes the percentage of capacity amount 290 for digital use. Specifically, the sub-processor 120 collects and averages a set of percentage of capacity amounts over a predetermined interval, such as ten seconds, in a filter 330. The filtered amount is then converted to a format compatible with vehicle bus protocols (such as J1587) at 331 and output, at 332, to the vehicle information system 31 using a timer 334. The timer 334 is then reset at 336.

The filtered amount is also converted, on demand, to a format compatible with the communication link to the extra-vehicular network 35. The filtered amount is converted to a binary value at 340 and then transmitted to the communication link (e.g., transponder 34) with appropriate handshakes, etc., at 344.

Once the sub-processor 120 has calculated the percentage of capacity amount 290 and converted it to a format compatible with the vehicle bus and extra-vehicular network, additional calculations can be made to provide additional information regarding fuel usage. To conduct these additional calculations, the processor 92 must receive or gather information from the vehicle information system 31, such as the miles traveled or rate of fuel usage. The processor 92 may also obtain vehicle identity information from the vehicle information system, to assist the dispatch terminal in maintaining records for multiple vehicles. Depending on the implementation of the invention, the processor 92 (upon interrogation by the fuel optimization server 41) then transmits the percentage of capacity amount 290 (properly formatted), and other calculated values to the dispatch terminal. The dispatch terminal 39 uses the information provided by the processor 92, information from the fuel price location service 46 or 47, vehicle position and direction data from the vehicle information system 31, and algorithms understood by those of ordinary skill in the art to determine optimal refueling locations and other messages. The refueling and message information is sent back to the vehicle 27 to inform the driver of the optimal refueling location.

One data value that the processor determines using the percentage of capacity value 290 is the distance that may be traveled until the fuel tank is empty ("miles-to-empty value"). The algorithm implemented by the processor is as follows. The processor 92 reads the fuel capacity of the tank or tanks installed in the vehicle 27. (The capacity of the fuel tank may be programmed into the processor 92 through the data bus or through various select lines.) The processor 92 also calculates an average fuel economy value. The fuel economy value is calculated using a data filter that employs an arithmetic average of the fuel quantity remaining over a short period of time such as 3 to 4 minutes. This helps reduce errors associated with fuel movement in the tank. The processor then calculates a miles per gallon or fuel economy value by finding the quotient of the net difference in the measured fuel quantity weighted average versus the net difference in a total vehicle distance value obtained from the vehicle information system. The calculation period for the determination is set at a predetermined time, such as one hour.

In order to obtain an accurate determination of the fuel economy value, the processor 92 ignores data received when the vehicle 36 is idling. The processor also ignores data produced as a result of the vehicle traveling a short distance, for example, twenty miles or less. The processor also ignores data produced as a result of the vehicle consuming a minimum amount of fuel, such as three and one-half gallons. Preferably, the fuel economy value is calculated using a weighted average of sixteen points representing sixteen hours of operation and, once determined, the value is stored in non-volatile memory for use following resets. In the next step of calculating the miles-to-empty value, the processor 92 obtains a vehicle position message and vehicle direction message from the vehicle information system. (The vehicle information system may obtain location and direction information from a GPS system in the vehicle.) The percentage of capacity value 290 is then multiplied by the capacity of the fuel tank or tanks in the vehicle 27 to yield a fuel remaining value for the tank(s) in the vehicle. The fuel remaining value is multiplied by the average fuel economy value to yield a miles-to-empty value. The fuel quantity remaining, fuel usage rate, fuel tank size, fuel economy value, and vehicle location information are communicated to fuel optimization server 41. The vehicle location, status, and percentage of capacity value, and miles to empty value may also be communicated to the dispatch terminal.

Upon receipt of the information, the fuel optimization server 41 dials up the fuel-price-by-location service and selects the optimal refueling location based upon the vehicle's position, direction, miles-to-empty value, tax information, preference information (such as a driver preference for divided highways versus two-lane roads), fuel contracts, etc. The location of the optimal refueling location may then be displayed for an operator at the dispatch terminal. The operator may then relay that information, by means of a telephone link, for example, to the vehicle 27. Preferably, the fuel optimization software generates a message containing the location of the optimal refueling location and transmits it back to dash display 33 or vehicle PC 50 without any human interaction. The dash display 30 or vehicle PC 50 displays the refueling location to the vehicle driver. Additional information may also be displayed to the driver, if appropriate. For example, if the processor 92 determines that the miles-to-empty value is below a predetermined level, such as 200 miles, a low fuel warning message may be broadcast to the dash display 33 or vehicle PC 50.

As an alternative to the above method, the fuel tank capacity of the vehicle may be programmed into the dispatch terminal and the processor 92 may periodically retrieve the fuel tank capacity from the dispatch terminal 39. This avoids the need to individually program each system 90 when it is installed in a vehicle. However, a preprogramming step is still required to set up the dispatch terminal and, in many instances, each time the fuel tank capacity is retrieved by the processor 92 from the dispatch terminal, communication charges are incurred.

To avoid the problems associated with obtaining the tank capacity in the algorithms discussed above, the processor 92 may be programmed to calculate the miles-to-empty value using a ratio-metric approach. In particular, the percentage of capacity value 290 and a total vehicle distance traveled value from the vehicle information system may be used to infer the miles-to-empty value. Table 1, below, illustrates the necessary calculations.

TABLE 1

| Total Vehicle Distance Traveled (from vehicle information system) | Percentage of Capacity Value | Ratio of Vehicle Distance to 1% Δ in Capacity | Miles-to-empty Projection | Action |
|---|---|---|---|---|
| 50,000 | 15.0% | | | |
| 50,010 | 14.4% | 16.01 | 230 | |
| 50,020 | 13.7% | 15.96 | 219 | |
| 50,030 | 13.1% | 15.89 | 208 | Broadcast miles-to-empty value to dispatch terminal |
| 50,170 | 4.4% | 15.96 | 69 | |
| 50,180 | 3.7% | 15.96 | 59 | |
| 50,190 | 3.1% | 15.96 | 49 | Broadcast low fuel warning |

As with the first two algorithms described herein, once the miles-to-empty value is calculated, the processor 92 broadcasts the miles-to-empty value on the vehicle bus and communicates that value (along with other information obtained from the vehicle information system) to the dispatch terminal. The dispatch terminal then determines the optimal refueling location and that location is relayed back to the vehicle 92. The processor 92 also determines whether the miles-to-empty value is below a predetermined level. If so, the processor 92 broadcasts a warning message to the dash display 33.

One advantage of the algorithm exemplified by Table 1 is that the miles-to-empty value may be determined without knowing the fuel capacity of the tank(s) in the vehicle 27. However, the miles-to-empty value obtained through this method is only an estimation. A more accurate determination may be made using a modified form of the method that relies on fuel economy data, which may be calculated as described above. Using the average fuel economy value, the processor 92 may determine tank size according to the following equation.

Tank Size=[(Miles/percentage of capacity)×100]/(Average Fuel Economy)   Eqn. 1

The implementation of the modified algorithm is illustrated in Table 2.

TABLE 2

| Total Vehicle Distance (from vehicle information system) | Percentage of Capacity Value Measurement | Ratio of Distance to a 1% Δ in Capacity Miles / % | Average Fuel Economy | Tank Size Projection |
|---|---|---|---|---|
| 50,000 | 15.0% | | 6.67 | |
| 50,010 | 14.4% | 16.01 | 6.65 | 241 |
| 50,020 | 13.7% | 15.96 | 6.62 | 241 |
| 50,030 | 13.1% | 15.89 | 6.65 | 239 |
| 50,170 | 4.4% | 15.96 | 6.65 | 240 |
| 50,180 | 3.7% | 15.96 | 6.65 | 240 |
| 50,190 | 3.1% | 15.96 | 6.65 | 240 |

Once the processor 92 has the ability to "learn" the capacity of the tank in the vehicle 27, it may execute additional algorithms to identify leaks in the fuel system. The processor 92 may identify leaks by periodically determining the tank capacity, storing that size in memory, and determining whether a change in the capacity has occurred between measurements. If a significant change has occurred, such as a drop of about 85% or more, a leak condition is likely to exist.

Figure 23:
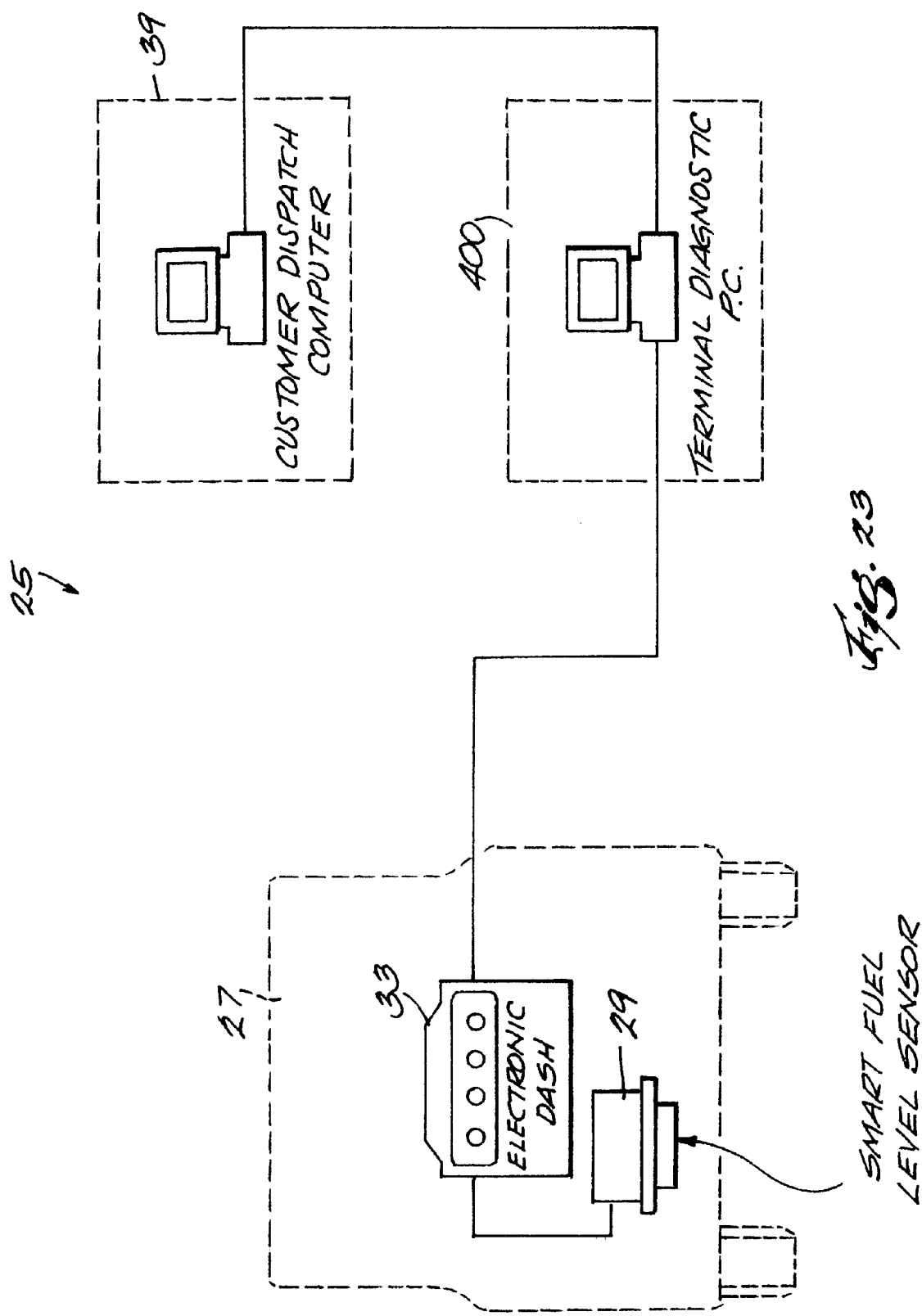
FIG. 23 is a block diagram of an embodiment of the invention configured to monitor fraudulent re-fueling activities.

The processor 92 may also identify instances of refueling fraud by calculating the amount of fuel in the fuel tank at times when fueling is likely to occur, such as when the vehicle is stationary or at times just after refueling is likely to have occurred, such as upon power up. After taking these measurements, the processor 92 broadcasts them to the dispatch terminal which stores them for later evaluation against manual log entries recorded by the driver and entered into the dispatch terminal via a man-machine interface, such as a keyboard, touch screen, etc. As shown in FIG. 23, a diagnostic terminal 400 may be used to determine discrepancies between the values recorded in the dispatch terminal and those recorded by the driver to uncover fuel fraud or theft.

The basic ratio-metric algorithm described may also be used to calculate the amount of fuel remaining in the fuel tank of the vehicle. A fuel remaining value may be determined according to Eqn. 3, as shown in Table 3.

$$FQR=[(PCV) \times (RDCCM/\%) \times 100]/(AFE)$$   Eqn. 3 where FQR is the Fuel Quantity Remaining, PCV is the Percentage of Capacity Value, RDCCM is the Ratio of Distance to a 1% Capacity Change in Miles, and AFE is the Average Fuel Economy.

TABLE 3

| Total Vehicle Distance | Percentage of Capacity Value Measurement | Ratio of Distance to a 1% Δ in Capacity Miles/% | Average Fuel Economy | Fuel Remaining Projection in Gallons |
|---|---|---|---|---|
| 50,000 | 15.0% | | 6.67 | |
| 50,010 | 14.4% | 16.01 | 6.65 | 35 |
| 50,020 | 13.7% | 15.96 | 6.62 | 33 |
| 50,030 | 13.1% | 15.89 | 6.65 | 31 |
| 50,170 | 4.4% | 15.96 | 6.65 | 10 |
| 50,180 | 3.7% | 15.96 | 6.65 | 9 |
| 50,190 | 3.1% | 15.96 | 6.65 | 7 |

In addition to the miles-to-empty and fuel remaining calculations, the processor 92 may perform an hours to empty calculation to determine an hours to empty value. In an hours-to-empty calculation, rather than consider fuel economy in miles per gallon, total fuel used in gallons is considered. Likewise, total engine hours is used in lieu of total mileage. Alternatively, the processor could make the same calculation by monitoring fuel flow rate (described below) in gallons per second and the processor's internal time standard to deduce hours to empty and tank capacity/size.

To accomplish this, the processor 92 utilizes data from the vehicle information system, as listed in Table 4.

TABLE 4

| Variable | Range | Resolution |
|---|---|---|
| Total Fuel Used In Gallons | 4 characters (32 bits) from 0 to 536,870,911.9 gallon | 0.125 gallon |
| Total Engine Hours | 4 characters (32 bits) from 0 to 214,748,364.8 hours | 0.05 hours |
| Fuel Rate | 2 characters (16 bits) from 0.0 to 0.28442190 Gallons/second | 4.34 × 10-6 gal/sec |

Table 4 and the discussion above refer to a variable called "fuel rate." The fuel rate or, more accurately, the average fuel flow rate is the running average of fuel flow. The running average is generated by one of two methods. The first method involves periodically reading (such as every 0.2 seconds) the fuel rate provided by the vehicle information system and averaging that number over a sufficient period of time (such as between 1 and 5 minutes) or by any other averaging scheme that eliminates short-term variability caused by rapid throttle changes. The average (regardless of how determined) multiplied by 3600 is equal to the average fuel flow rate in gallons per hour.

The second method involves periodically reading the total fuel used and the total engine hours from the vehicle information system and adding the quantities to previously read quantities from previous time periods. A suitable period is between 1 and 5 minutes or any other time sufficient to eliminate short-term variability caused by rapid throttle changes. The net fuel used divided by the net engine hours yields the average fuel flow rate in gallons per hour.

Determining the hours to empty value is particularly useful for off-road applications of the system 25 such as at large construction sites, mines, landfills, and the like where vehicles are run for long periods of time on a regular basis and require frequent refueling. In these instances, it is not necessary to determine the optimal location for refueling, but the timing of refueling can be optimized so that vehicles remain in operation for the longest period of time possible. When used in these types of applications, the processor 92 calculates the fuel remaining value in gallons by multiplying the percentage of capacity value by the fuel capacity of the tank(s) in the vehicle. The fuel remaining value is then divided by the average fuel flow rate to yield an hours to empty value.

The processor 92 generates a warning message when the hours to empty value drops below a predetermined level, such as five hours, and displays a warning message to the driver on the dash display 33. In such an application, the processor may or may not be linked to a dispatch terminal. However, a modified version of the system 25 could be created where the dispatch terminal is used to record information, without linking to a fuel-price-by-location service, and to inform an operator at the dispatch terminal of vehicle conditions. In particular, the percentage of capacity value, hours to empty value, vehicle location, and fuel quantity remaining value could be broadcast on the vehicle bus and transmitted to the dispatch terminal.

One drawback of the method discussed above is that it requires the tank capacity of the vehicle to be preprogrammed into the processor 92. To eliminate the preprogramming problem, tank capacity may be programmed into the dispatch terminal. Alternatively, the hours to empty value may be obtained using an inference method.

The hours to empty value may be obtained using the percentage of capacity value 290, the internal timing (clock) of the processor 92, and the average fuel flow rate. The inference method employed is illustrated in Table 5.

TABLE 5

| Relative Time Period in Hours | Percentage of Capacity Value | Ratio of Hours to a 1% Δ in Capacity | Hours to Empty Projection | Action |
|---|---|---|---|---|
| 0.0 | 15.0% | | | |
| 0.2 | 14.4% | 0.32 | 4.60 | |
| 0.4 | 13.8% | 0.32 | 4.42 | |
| 0.6 | 13.1% | 0.32 | 4.23 | |
| 0.8 | 12.5% | 0.32 | 4.05 | Broadcast hours to empty for refueling Determination |
| 3.40 | 4.4% | 0.32 | 1.41 | |
| 3.60 | 3.8% | 0.32 | 1.21 | |
| 3.80 | 3.2% | 0.32 | 1.02 | Broadcast Low Fuel Warning |

The ratio-metric approach illustrated in Table 5, eliminates the need to know the tank capacity, but is not as accurate as methods that rely on tank capacity knowledge. However, the ratio-metric method may be modified to permit the processor 92 to learn the vehicle tank capacity, increasing accuracy, while still eliminating the need to pre-program tank capacity information. Tank capacity/size may be determined according to Eqn. 4, as illustrated in Table 6.

$$\text{Tank Size} = [(\text{Hours}/\%) \times 100] * (\text{Average Fuel Flow}) \qquad \text{Eqn. 4}$$

TABLE 6

| Relative Time Period in Hours | Percentage of Capacity Value Measurement | Ratio of Hours to 1% Δ in Capacity | Average Fuel Flow Rate in Gallons/Hr | Tank Size Projection |
|---|---|---|---|---|
| 0.0 | 15.0% | | 7.50 | |
| 0.2 | 14.4% | 0.32 | 7.45 | 238 |
| 0.4 | 13.8% | 0.32 | 7.40 | 238 |
| 0.6 | 13.1% | 0.32 | 7.35 | 238 |
| 0.8 | 12.5% | 0.32 | 7.40 | 242 |
| 0.8 | 12.5% | 0.32 | 7.45 | 242 |
| 3.40 | 4.4% | 0.32 | 7.45 | 242 |
| 3.60 | 3.8% | 0.32 | 7.50 | 242 |
| 3.80 | 3.2% | 0.32 | 7.55 | 242 |

As with on-road installations, once the processor 92 is configured to learn tank size in an off-road application, the system 25 may be used to identify fuel leaks, and detect fuel fraud or theft.

Once the processor 92 is configured to learn tank capacity based on hours, a fuel quantity remaining value may be obtained by finding the quotient of the tank capacity and the percentage of capacity value, according to Eqn. 5.

$$FQR = [(PCV) \times (RHCCH/\%) \times 100] * (AFFR) \qquad \text{Eqn. 5}$$

where FQR is the Fuel Quantity Remaining, PCV is the percentage of capacity value, RHCCH is the Ratio of Hours to a 1% Capacity Change in Hours, and AFFR is the Average Fuel Flow Rate. The calculation is illustrated in Table 7.

TABLE 7

| Relative Time Period in Hours | Percentage of Capacity Value Measurement | Ratio of Hours to a 1% Δ in Capacity (Hours/%) | Average Fuel Flow Rate (Gal/Hr) | Fuel Remaining Projection in Gallons |
|---|---|---|---|---|
| 0.0 | 15.0% | | 7.50 | |
| 0.2 | 14.4% | 0.32 | 7.45 | 34.3 |
| 0.4 | 13.8% | 0.32 | 7.40 | 32.7 |
| 0.6 | 13.1% | 0.32 | 7.35 | 31.1 |
| 0.8 | 12.5% | 0.32 | 7.40 | 30.0 |
| 3.40 | 4.4% | 0.32 | 7.45 | 10.5 |
| 3.60 | 3.8% | 0.32 | 7.50 | 9.7 |
| 3.80 | 3.2% | 0.32 | 7.55 | 7.7 |

As should be apparent from the discussion above, the present invention has the ability to provide a variety of fuel-related information: percentage of capacity, miles or distance to empty, tank capacity, hours to empty, and fuel remaining. Since the calculations carried out to determine these values are slope based (y=mx+b), it is preferred that the system 25 be designed to compensate or account for potential errors. Appropriate error management may be implemented by analyzing the "absolute error" and "relative error" of the calculations executed by the processor 92.

Absolute error, in terms of the percentage of capacity value, is simply the error at any level over the full range of operating conditions likely to be encountered by the system 25. This is best understood by review of an example. Table 8 includes a series of measurements, taken at 30-minute intervals, as fuel drains from a tank and as the temperature cycles over an operating range of the processor 92.

TABLE 8

| Measurement | Sensors Percent of Capacity Value | Actual Percentage of Capacity Value | Difference |
|---|---|---|---|
| Initial | 56.0 | 55.0 | 1.0 |
| 0.20 Hours | 53.9 | 53.0 | 0.9 |
| 0.40 Hours | 51.8 | 51.0 | 0.8 |
| 0.60 Hours | 49.7 | 49.0 | 0.7 |
| 0.80 Hours | 47.6 | 47.0 | 0.6 |
| 1.00 Hour | 45.5 | 45.0 | 0.5 |
| 1.20 Hours | 43.4 | 43.0 | 0.4 |
| 1.40 Hours | 41.3 | 41.0 | 0.3 |
| 1.60 Hours | 39.2 | 39.0 | 0.2 |
| 1.80 Hours | 37.1 | 37.0 | 0.1 |
| 2.00 Hours | 35.0 | 35.0 | 0.0 |
| 2.20 Hours | 32.9 | 33.0 | -0.1 |
| 2.40 Hours | 30.8 | 31.0 | -0.2 |

According to the values in Table 8, the worst case absolute error is +1.0%/−0.2% for the measurements made. When the error does not significantly differ over the balance of the operating range, then the absolute error can be restated as:

$$\text{Percentage of Full Scale Error} = 1.0\%  \qquad \text{Eqn. 6}$$

This means that the full-scale error will not, at any time, exceed ±1.0% of the full-scale output that, in the case illustrated, is 1.0%.

The performance of the processor 92 may also be evaluated using RSS (root square sum) error theory. Using the hours to empty algorithm discussed above, the representations shown in Table 9 may be developed. The data in Table 9 is for a ⅓ full, 240-gallon tank(s) with a fuel flow rate of approximately 7.5 gallons per hour.

TABLE 9

| | RSS Error Portion Caused By Absolute Capacity Errors | | | | |
|---|---|---|---|---|---|
| Processor Output | Absolute Capacity Error of 0.50% | Absolute Capacity Error of 1.00% | Absolute Capacity Error of 1.50% | Absolute Capacity Error of 2.00% | Absolute Capacity Error of 2.50% |
| Hours to Empty | 0.16 | 0.32 | 0.48 | 0.64 | 0.80 |
| Tank Size in Gallons | 0.00 | 0.00 | 0.00 | 0.00 | 0.00 |
| Gallons Remaining in Tank | 1.19 | 2.38 | 3.58 | 4.77 | 5.96 |

As can be seen from Table 9, absolute error affects the hours to empty and the gallons remaining error budgets, but does not affect the tank capacity/size calculation. The key considerations from Table 9 are that each 1.0% in absolute error creates a 0.32 hour error in the time to empty measurement (±19 minutes or less) and at least a 2.38 gallon error in the remaining fuel calculation. The data illustrates that the accuracy of both quantities, gallons remaining and time to empty, improves as fuel drains from the tank.

While an analysis of absolute error is useful, it is incomplete without an analysis of the relative error. Relative error is the error of the curve slope (slope error=Δm) over a relatively short period of time. That is, the relative error is the difference between two time-sequenced measurements as compared with the actual difference. Using the identical example from above and applying the differential concept yields the data in Table 10.

TABLE 10

| Measurement | Δ Processor's Percentage of Capacity Value | Δ Actual Percentage of Capacity Value | Difference between the Δ's |
|---|---|---|---|
| Initial | — | — | — |
| Initial to 0.20 hrs | 2.1 | 2.0 | 0.1 |
| 0.20 to 0.40 hrs | 2.1 | 2.0 | 0.1 |
| 0.40 to 0.6 hrs | 2.1 | 2.0 | 0.1 |
| 0.60 to 0.8 hrs | 2.1 | 2.0 | 0.1 |
| 0.80 to 1.00 hrs | 2.1 | 2.0 | 0.1 |
| 1.00 to 1.20 hrs | 2.1 | 2.0 | 0.1 |
| 1.20 to 1.40 hrs | 2.1 | 2.0 | 0.1 |
| 1.40 to 1.60 hrs | 2.1 | 2.0 | 0.1 |
| 1.60 to 1.80 hrs | 1.9 | 2.0 | -0.1 |
| 1.80 to 2.00 hrs | 1.9 | 2.0 | -0.1 |
| 2.00 to 2.20 hrs | 1.9 | 2.0 | -0.1 |
| 2.20 to 2.40 hrs | 1.9 | 2.0 | -0.1 |

As measured, the relative error from measurement to measurement varies between 0.1% and −0.1% of full-scale capacity, far less than the 1.0% absolute error recorded for the same data.

It is preferred that the relative error be below 0.2% of full scale. Using RSS error theory representations were developed using the hours to empty analysis, as described previously, for a ⅓ full, 240-gallon tank(s) with a fuel flow rate of approximately 7.5 gallons per hour. The representations are set out in Table 11.

TABLE 11

RSS Error Portion Caused By Relative Capacity Errors

| Processor Output | Relative Capacity Error of 0.050% | Relative Capacity Error of 0.10% | Relative Capacity Error of 0.15% | Relative Capacity Error of 0.20% | Relative Capacity Error of 0.25% |
|---|---|---|---|---|---|
| Hours to Empty | 0.37 | 0.74 | 1.10 | 1.47 | 1.84 |
| Tank Size In Gallons | 2.74 | 5.48 | 8.22 | 10.97 | 13.71 |
| Gallons Remaining In Tank | 2.74 | 5.48 | 8.22 | 10.97 | 13.71 |

As Table 11 shows, relative error has a relatively significant impact on the error budget and accuracy of calculations. Every 0.10% error in the relative accuracy of two time-indexed measurements causes an error of up to 0.75-hours (45 minutes) in the hours to empty calculation, an error of up to 5.48 gallons in the tank capacity/size calculations, and an error of up to 5.48 gallons in the fuel remaining value. As with absolute error, these errors increase at increased fuel levels and decrease as the fuel level decreases.

As has been described, the system 90 is fairly sensitive to the relative accuracy of the percentage of capacity value and somewhat sensitive to the absolute accuracy. A number of design choices and general environmental issues affect these sensitivities. Table 12 sets out the effects of various factors.

TABLE 12

| Factor | Type of Error | Effect |
|---|---|---|
| Fuel exchange and return between multiple tanks in a vehicle | Absolute and relative | Creates an imbalance of fuel proportioned between one tank and the other. The relative error is created when the return fuel proportional balance changes causing the fuel delivered to one tank to change relative to the other. This change translates into an exaggerated difference measurement. The effect on the % of capacity measurement is uncertain. |
| Pitch | Absolute | A four degree pitch can cause up to a 3% full scale error in the percentage of capacity value. Placement of transducer in middle of the tank where possible, likely to reduce error. |
| Roll | Absolute | Fuel drains from the high tank to the low tank. The fuel return and crossover system mitigates and masks this error. |
| Temperature | Absolute | Speed of sound changes as temperature changes causing temperature compensation errors. Usually, temperature changes slowly. Thus, from a relative standpoint, temperature generally remains unchanged. |
| Standing Waves | Absolute and relative | Wave action within the tank creates large level changes in response to acceleration changes and road vibration. This error accounts for most of the system errors and can be reduced via data filtering. The fuel level may change by ±19% when the vehicle is moving over the road at moderate speeds. |
| Data Filtering | Absolute and relative | In one embodiment, the level measurement is averaged through a 57-tap FIR filter over 2.85 seconds. A second filter may be used to address effects of road noise, vibration, and wave motion in the tank. A 120 second averaging filter may be used to create an absolute accuracy of 1.042% |
| Level to Percentage of Capacity Conversion | Absolute and relative | The absolute and relative accuracy of the look up table can directly affect performance. |

The inventor(s) believe(s) that one way to manage relative accuracy is to save consecutive time indexed percentage of capacity data readings in RAM and periodically fit the data to a straight line using a least squares best fit approach. The slope of the straight line obtained is then used as the $\Delta\%Capacity/\Delta time$ quotient. The $\Delta\%Capacity/\Delta time$ quotient is then used to provide the basis for the calculations of time to empty, tank size, and other fuel related data.

Thus, the present invention provides a fuel optimization system with an improved fuel level sensor. The system generates refueling and fuel usage information that prior systems are unable to provide. The system also provides enhanced protection against fuel fraud or theft. Yet, the foregoing description describes only a few of the many forms that the present invention can take, and should therefore be taken as illustrative rather than limiting. It is only the following claims, including all equivalents, that are intended to define the scope of the invention.

What is claimed is:

1. A method of calculating a miles-to-empty value for a fuel tank of a vehicle, the vehicle having a vehicle information system, the method comprising the acts of:

acquiring a percentage of capacity value converted from a distance signal between a surface of the fuel in the fuel tank and a fuel level sensor removably mounted on top of the fuel tank;

acquiring a total fuel capacity value for the fuel tank from a data storage device located remotely from the vehicle;

calculating a fuel economy value based on a vehicle distance traveled value obtained from the vehicle information system;

calculating a fuel remaining value by multiplying the percentage of capacity value by the total fuel capacity value; and calculating a miles-to-empty value by multiplying the fuel remaining value by the fuel economy value.

2. A method as set forth in claim 1, further comprising the act of filtering the percentage of capacity value to reduce measurement effects of standing waves in the fuel tank.

3. A method as set forth in claim 1, further comprising the acts of determining whether the miles-to-empty value is less than a predetermined level, determining whether the percentage of capacity value is less than a predetermined value and, upon determining that the miles-to-empty value is less than the predetermined level or the percentage of capacity value is less than the predetermined value, broadcasting a low fuel message to a display device in the vehicle.

4. A method as set forth in claim 1, wherein a distance signal is acquired from the fuel level sensor and converted using a look-up table to generate the percentage of capacity value.

5. A method of calculating a miles-to-empty value for a fuel tank of a vehicle having a vehicle management system, the method comprising the acts of:
acquiring a first percentage of capacity value from a fuel level sensor mounted on the fuel tank at a first moment in time;
acquiring a second percentage of capacity value from a the fuel level sensor mounted on the fuel tank at a second moment in time after the first moment in time;
acquiring a vehicle distance traveled value from the vehicle management system;
calculating a change in percentage of capacity value based on the first percentage of capacity value and the second percentage of capacity value; and
calculating a miles-to-empty value by dividing the vehicle distance traveled value by the change in percentage of capacity value and multiplying the result by the second percentage of capacity value.

6. A method as set forth in claim 5 further comprising the act of filtering the second percentage of capacity value through a filter to reduce measurement effects of standing waves in the fuel tank.

7. A method as set forth in claim 5 further comprising the acts of determining whether the miles-to-empty value is less than a predetermined level and upon determining that the miles-to-empty value is less than the predetermined level, broadcasting a low fuel message to a display device in the vehicle.

8. A method as set forth in claim 5 wherein the act of acquiring the second percentage of capacity value further includes the acts of acquiring a distance signal from the fuel level sensor and converting the distance signal to a present percentage of capacity value.

9. A method of calculating a tank size for a fuel tank of a vehicle, the vehicle having a vehicle management system, the method comprising the acts of:
acquiring a first percentage of capacity value from a fuel level sensor mounted on the fuel tank at a first moment in time;
acquiring a second percentage of capacity value from the fuel level sensor mounted on the fuel tank at a second moment in time after the first moment in time;
calculating a fuel economy value by acquiring a vehicle distance traveled value from the vehicle management system;
calculating a change in percentage of capacity value based on the first percentage of capacity value and the second percentage of capacity value; and
calculating a tank size value by dividing the vehicle distance traveled value by the change in percentage of capacity value, multiplying the quotient by 100, and dividing the multiplied quotient by the fuel economy value.

10. A method as set forth in claim 9, further comprising the act of filtering the second percentage of capacity value through a filter to reduce measurement effects of standing waves in the fuel tank.

11. A method of calculating an amount of fuel remaining in a fuel tank of a vehicle, the vehicle having a vehicle management system, the method comprising the acts of:
acquiring a first percentage of capacity value from a fuel level sensor mounted on the fuel tank at a first moment in time;
acquiring a second percentage of capacity value from the fuel level sensor mounted on the fuel tank at a second moment in time after the first moment in time;
calculating a fuel economy value based on information from the vehicle management system;
calculating a change in percentage of capacity value based on the first percentage of capacity value and the second percentage of capacity value; and
calculating a fuel remaining value by multiplying the second percentage of capacity value by the change in percentage of capacity value, multiplying the result by 100, and then dividing the multiplied result by the fuel economy value.

12. A method as set forth in claim 11 further comprising the act of filtering the second percentage of capacity value through a filter to reduce measurement effects of standing waves in the fuel tank.

13. A method of determining the number of hours until a fuel tank of a vehicle is empty, the vehicle having a vehicle management system, the method comprising the acts of:
acquiring a first percentage of capacity value from the a fuel level sensor mounted on the fuel tank at a first moment in time;
acquiring a second percentage of capacity value from the fuel level sensor mounted on the fuel tank at a second moment in time after the first moment in time;
acquiring a tank capacity value from a storage device;
calculating a fuel remaining value by multiplying the second percentage of capacity value by the tank capacity value;
acquiring a fuel flow rate value from the vehicle management system, the fuel flow rate value representing a rate of fuel flow out of the fuel tank for consumption by the vehicle; and
calculating an hours to empty value by multiplying the fuel remaining value by the fuel flow rate value.

14. A method as set forth in claim 13 further comprising the act of filtering the second percentage of capacity value through a filter to reduce measurement effects of standing waves in the fuel tank.

15. A method of determining the number of hours until a fuel tank of a vehicle is empty, the vehicle having a vehicle management system, the method comprising the acts of:
acquiring a first percentage of capacity value from a fuel level sensor mounted on the fuel tank at a first moment in time;
acquiring a second percentage of capacity value from the fuel level sensor mounted on the fuel tank at a second moment in time after the first moment in time;
acquiring a relative hours value from the fuel level sensor, the relative hours value representing a difference between the first moment in time and the second moment in time;

calculating a change in percentage of capacity value based on the first percentage of capacity value and the second percentage of capacity value; and calculating an hours to empty value by dividing the relative hours value by the change in percentage capacity value and multiplying the result by the second percentage of capacity value.

16. A method as set forth in claim 15 further comprising the act of filtering the second percentage of capacity value through a filter to reduce measurement effects of standing waves in the fuel tank.

17. A method of calculating a tank size for a fuel tank of a vehicle, the vehicle having a vehicle management system, the method comprising the acts of:

acquiring a first percentage of capacity value from a fuel level sensor mounted on the fuel tank at a first moment in time;

acquiring a second percentage of capacity value from the fuel level sensor mounted on the fuel tank at a second moment in time after the first moment in time;

acquiring a relative hours value from the fuel level sensor, the relative hours value representing a difference between the first moment in time and the second moment in time;

acquiring a fuel flow rate value from the vehicle management system, the fuel flow rate value representing a rate of fuel flow out of the fuel tank for consumption by the vehicle;

calculating a change in percentage of capacity value based on the second percentage of capacity value and the first percentage of capacity value; and calculating a ratio value of the relative hours value to the change in percentage of capacity value; and calculating a tank size value by multiplying the ratio value by the fuel flow rate value.

18. A method of identifying a tank leak in a fuel tank of a vehicle, the vehicle having a vehicle management system, the method comprising the acts of:

acquiring a first tank capacity value at a first time;

acquiring a second tank capacity value at a second, later time;

dividing the second tank capacity value by the first tank capacity value to obtain a quotient; and determining whether the quotient is less than a predetermined value and, upon determining that the quotient is less than the predetermined value, broadcasting a leak message.

19. A method as set forth in claim 18 wherein each of the first and second tank capacity values is calculated by acquiring a first percentage of capacity value from a fuel level sensor mounted on the fuel tank at a first moment in time;

acquiring a second percentage of capacity value from the fuel level sensor mounted on the fuel tank at a second moment in time;

acquiring a relative hours value from the fuel level sensor, the relative hours value representing a difference between the first moment in time and the second moment in time;

acquiring a fuel flow rate value from the vehicle management system, the fuel flow rate value representing a rate of fuel flow out of the fuel tank for consumption by the vehicle;

calculating a change in percentage of capacity value based on the second percentage of capacity value and the first percentage of capacity value;

calculating a ratio value of the relative hours to the change in percentage of capacity value for a relative fuel flow value; and multiplying the ratio value by the fuel flow rate value.

20. A method of identifying fraud in refueling a fuel tank of a vehicle, the vehicle having a vehicle information system, the method comprising the acts of:

measuring a first fuel value at a first time;

filling the fuel tank with fuel;

measuring a second fuel value at a second time following filling the fuel tank with fuel;

broadcasting the first and second fuel values to a computer, the computer calculating and recording the difference between the second and first fuel values;

acquiring a third fuel value through a man-machine interface, an operator of the vehicle providing the third fuel value using the man-machine interface, and delivering the third fuel value to the computer;

comparing the third fuel value to the difference between the second and first fuel values and generating a comparison value; and generating a fraud message if the comparison value is greater than a predetermined fraud value.

21. A method as set forth in claim 20 wherein each of the first and second fuel values is determined by acquiring a present percentage of capacity value from a fuel level sensor mounted on the fuel tank at a first moment in time;

acquiring a second percentage of capacity value from the fuel level sensor mounted on the fuel tank at a second moment in time;

acquiring a relative hours value from the fuel level sensor, the relative hours value representing a difference between the first moment in time and the second moment in time;

acquiring a fuel flow rate value from the vehicle information system, the fuel flow rate value representing a rate of fuel flow out of the fuel tank for consumption by the vehicle;

calculating a change in percentage of capacity value based on the second percentage of capacity value and the first percentage of capacity value;

calculating a ratio value of the relative hours value to the change in percentage of capacity value for a relative fuel flow value; and multiplying the ratio value by the fuel flow rate value.

* * * * *